United States Patent
Harada et al.

(10) Patent No.: US 9,140,958 B2
(45) Date of Patent: Sep. 22, 2015

(54) OPTICAL ELEMENT, LIGHT SOURCE DEVICE, AND OPTICAL ELEMENT PRODUCTION METHOD

(71) Applicants: NIKON CORPORATION, Tokyo (JP); National Institute For Materials Science, Tsukuba-shi, Ibaraki (JP)

(72) Inventors: Masaki Harada, Tokyo (JP); Kenichi Muramatsu, Sagamihara (JP); Sunao Kurimura, Tsukuba (JP)

(73) Assignees: NIKON CORPORATION, Tokyo (JP); NATIONAL INSTITUTE FOR MATERIALS SCIENCE, Ibaraki (JP)

( * ) Notice: Subject to any disclaimer, the term of this patent is extended or adjusted under 35 U.S.C. 154(b) by 0 days.

(21) Appl. No.: 13/627,308

(22) Filed: Sep. 26, 2012

(65) Prior Publication Data
US 2013/0027945 A1 Jan. 31, 2013

Related U.S. Application Data

(63) Continuation of application No. PCT/JP2011/056584, filed on Mar. 18, 2011.

(30) Foreign Application Priority Data

Mar. 26, 2010 (JP) .................. 2010-072524

(51) Int. Cl.
*G02B 7/02* (2006.01)
*G02F 1/355* (2006.01)
*G02F 1/35* (2006.01)

(52) U.S. Cl.
CPC ...... *G02F 1/3558* (2013.01); *G02F 2001/3505* (2013.01); *G02F 2201/46* (2013.01); *Y10T 29/49826* (2015.01)

(58) Field of Classification Search
CPC ......... G02C 7/08; G02B 7/002; G02B 25/002
USPC .......................................................... 359/816
See application file for complete search history.

(56) References Cited

U.S. PATENT DOCUMENTS

| 2004/0181212 A1 | 9/2004 | Kurimura et al. |
| 2005/0225215 A1 | 10/2005 | Kurimura et al. |

(Continued)

FOREIGN PATENT DOCUMENTS

| EP | 1457814 A2 | 9/2004 |
| EP | 1541722 A1 | 6/2005 |

(Continued)

OTHER PUBLICATIONS

Tsuyoshi Yamada et al. "Second Harmonic Generation in Blue Region by $1^{st}$—Order QPM in Quartz", Technical Digest CD-ROM/ Conference on Lasers and Electro-Optics, Quantum Electronics and Laser Science Conference, Conference on Photonic Applications, Systems and Technologies, May 21, 2006, pp. 1-2.

(Continued)

*Primary Examiner* — Dawayne A Pinkney

(57) ABSTRACT

According to one embodiment, an optical element is provided with a paraelectric crystal, first and second pressers between which the paraelectric crystal is sandwiched, and fasteners. The paraelectric crystal has a periodic structure in which polarities are periodically inverted along a polarity period direction. The fasteners fix the first and second pressers to each other so that a predetermined pressure is applied in a direction intersecting with the polarity period direction, to the paraelectric crystal through the first and second pressers.

28 Claims, 12 Drawing Sheets

(56) References Cited

U.S. PATENT DOCUMENTS

2008/0046043 A1 2/2008 Kurimura et al.
2011/0233799 A1* 9/2011 Kang .......................... 264/1.38

FOREIGN PATENT DOCUMENTS

| JP | 2004-107187 | 4/2004 |
|----|-------------|--------|
| JP | 2004-279612 | 10/2004 |
| JP | 2009-9075 | 1/2009 |

OTHER PUBLICATIONS

Muneyuki Adachi et al. "Deep Ultraviolet Light Generation at 266 NM by Quasi-Phase-Matched Quartz", CLEO '07, 2007 Conference on Lasers and Electro-Optics, May 6, 2007, pp. 1-2.

Extended European Search Report mailed Jan. 2, 2014 in corresponding European Application No. 11759336.8.

International Search Report mailed Nov. 1, 2012 in corresponding International Patent Application No. PCT/JP2011/056584.

Chinese Office Action for related Chinese Patent Application No. 201180015639.1, mailed on Aug. 14, 2014.

International Preliminary Report on Patentability mailed Nov. 1, 2012 in corresponding International Patent Application No. PCT/JP2011/056584.

Masaki Harada et al., "Quasi-phase matched second harmonic generation in crystal quartz", Proceedings of SPIE, vol. 5633, 2005, pp. 40-54.

European Office Action issued Dec. 16, 2014 in corresponding European Patent Application No. 11 759 336.8.

Japanese Office Action issued Mar. 17, 2015 in corresponding Japanese Patent Application No. P2012-506987.

Chinese Office Action issued Apr. 3, 2015 in corresponding Chinese Patent Application No. 201180015639.1.

Machine translation of JP 2004-107187, which was previously cited in the IDS filed Dec. 27, 2012.

Machine translation of JP 2004-279612, which was previously cited in the IDS filed Dec. 27, 2012.

* cited by examiner

OPTICAL ELEMENT, LIGHT SOURCE DEVICE, AND OPTICAL ELEMENT PRODUCTION METHOD

CROSS REFERENCE TO THE RELATED APPLICATIONS

This application is a continuation application of International Application PCT/JP2011/056584, filed on Mar. 18, 2011 and claims the foreign priority benefit of Japanese Application No. 2010-072524 filed on Mar. 26, 2010 and designating the U.S., the entire contents of which are incorporated herein by reference.

BACKGROUND

1. Field

One embodiment relates to an optical element, an optical element production method, and a light source device provided with the optical element.

2. Description of the Related Art

There is a known method making use of the second-order nonlinear optical effect of a nonlinear optical crystal to generate a second harmonic which is light of a wavelength equal to half that of incoming light into a solid-state laser (Second harmonic generation; SHG) and to use it as a short-wavelength laser beam. The nonlinear optical effect is an effect by nonlinearity of polarization response of substance, which is a phenomenon in which when strong light such as a laser beam is injected into a substance, the polarization response becomes non-proportional to an electric field of incoming light whereby part of the incoming light is subjected to wavelength conversion.

The second harmonic generated in fact has the wavelength slightly shorter than half of the wavelength of the incoming light because of the dispersion property of crystal. For this reason, phases of second harmonics become gradually deviating from each other, so as to result in cancellation of second harmonics with each other. In this case, it becomes difficult to generate the second harmonic in sufficient quantity.

For obtaining the second harmonic in sufficient quantity, there is a Quasi-Phase Matching element (QPM element) proposed. Quasi-phase matching is a method to avoid the cancellation of electric fields of second harmonics, in which a polarity inversion structure is formed in a crystal to change polarities into such directions as to avoid the cancellation of electric fields, thereby achieving quasi-phase matching to enable second harmonic generation. Concerning the quasi-phase matching element, recent investigation has been directed, particularly, toward a quasi-phase matching element in which a periodic polarity inversion structure is formed by applying an external force to quartz crystal as a paraelectric material (e.g., cf. Japanese Patent Application Laid-Open No. 2004-107187 and Japanese Patent Application Laid-Open No. 2004-279612).

To realize the quasi-phase matching, it is necessary to obtain a structure in which polarities of crystal are periodically inverted. For short-wavelength generation such as ultraviolet light, an ordinary method employed is to form polarity-inverted domains inside a single crystal. When the polarity inversion structure is formed in a ferroelectric material, a method employed is to invert spontaneous polarization by applying an external electric field. However, for example, in the case of ferroelectric materials such as lithium niobate and tantalum niobate, the absorption edge wavelength to determine the generated wavelength of the second harmonic is long, about 300 nm. For this reason, it becomes impossible to implement the second harmonic generation in the range of not more than 200 nm called the vacuum ultraviolet region. On the other hand, for example, quartz crystal as a paraelectric material is a nonlinear optical crystal with the absorption edge wavelength of not more than 150 nm.

SUMMARY

According to an embodiment, an optical element comprises:

a paraelectric crystal with a periodic structure in which polarities are periodically inverted along a polarity period direction; and a pair of pressers between which the paraelectric crystal is sandwiched and which is provided for applying a predetermined pressure in a direction intersecting with the polarity period direction of the paraelectric crystal, to the paraelectric crystal.

BRIEF DESCRIPTION OF THE SEVERAL VIEWS OF THE DRAWINGS

A general architecture that implements the various features of the invention will now be described with reference to the drawings. The drawings and the associated descriptions are provided to illustrate embodiments of the invention and not to limit the scope of the invention.

DETAILED DESCRIPTION

Various embodiments will be described hereinafter with reference to the accompanying drawings.

First Embodiment

Figure 1:
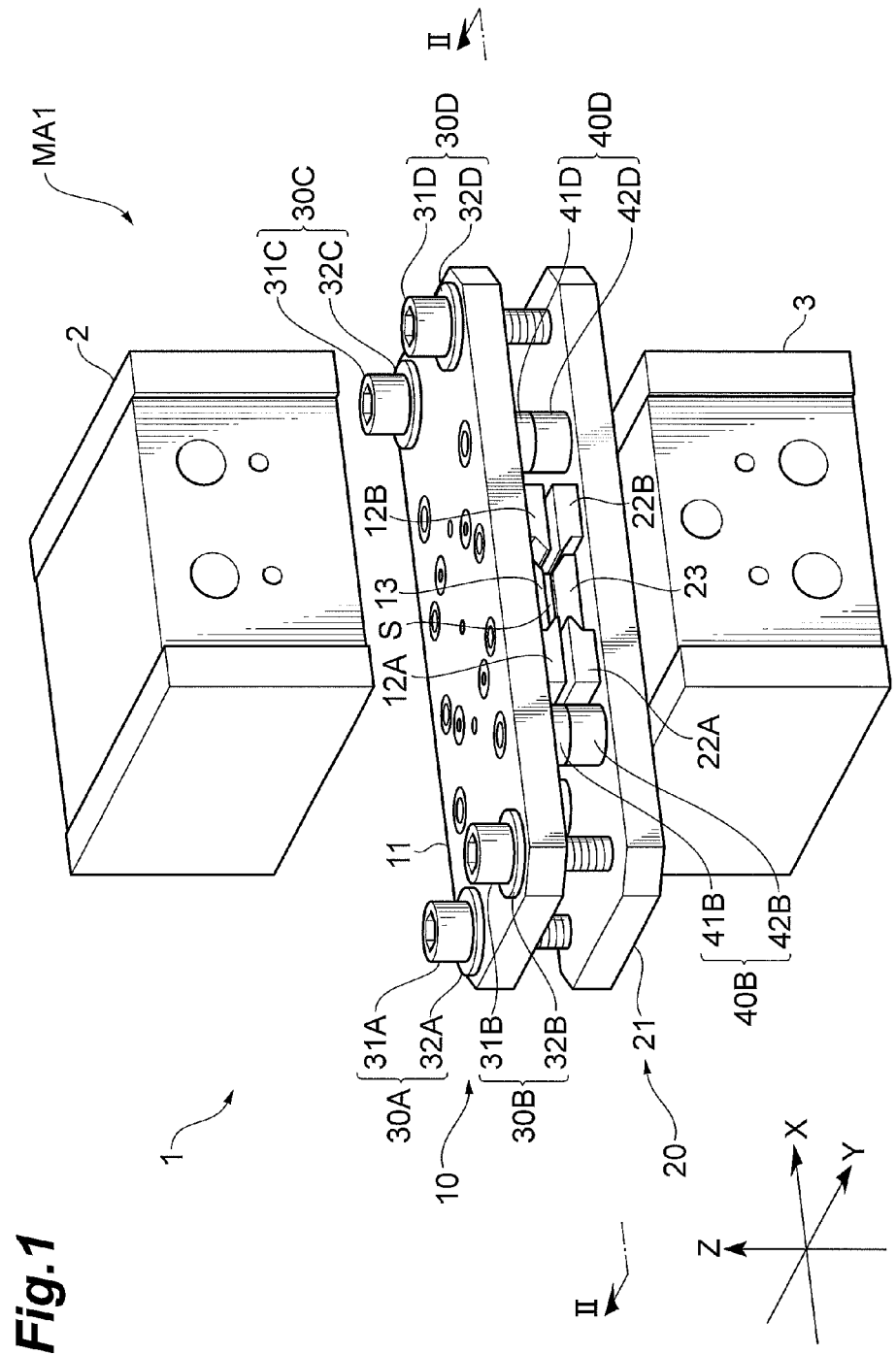
FIG. 1 is an exemplary exploded perspective view of an optical element and a manufacturing apparatus thereof according to the first embodiment.
Figure 2:
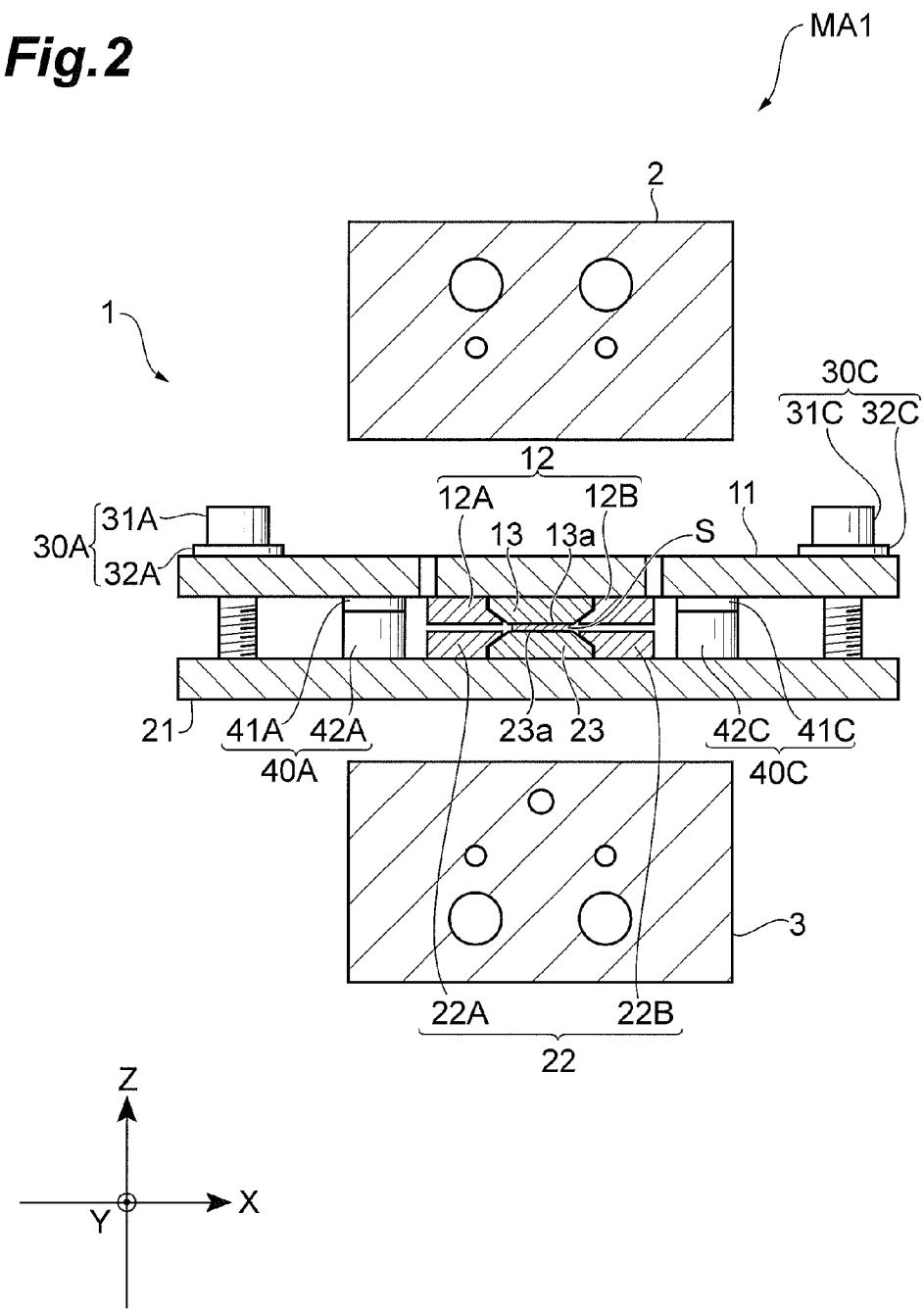
FIG. 2 is an exemplary sectional view along the line II-II in FIG. 1.
Figure 3:
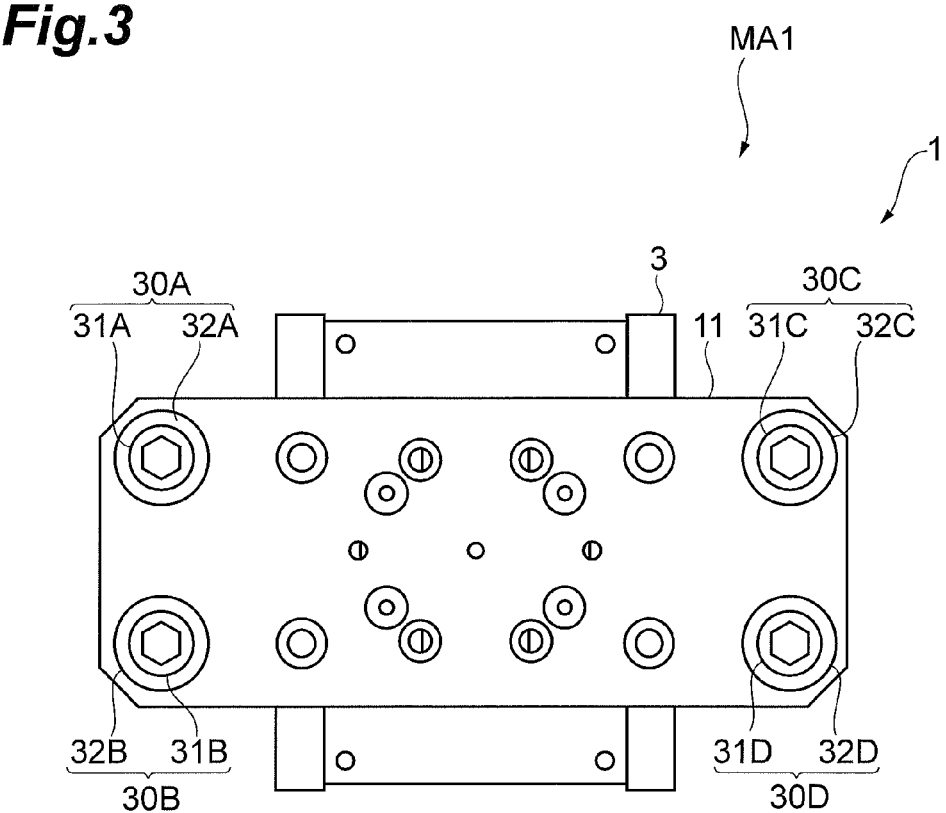
FIG. 3 is an exemplary top plan view of a part of the optical element and the manufacturing apparatus thereof according to the first embodiment.
Figure 3:
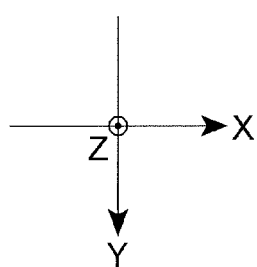

A configuration of an optical element 1 and a production method thereof according to the first embodiment will be described with reference to FIGS. 1 to 3. FIG. 1 is an exploded perspective view of the optical element and manufacturing apparatus thereof according to the first embodiment. FIG. 2 is a sectional view along the line II-II in FIG. 1. FIG. 3 is a top plan view of a part of the optical element and manufacturing apparatus thereof according to the first embodiment.

A manufacturing apparatus MA1 is provided with first and second pressure heater blocks (pressurizing means) 2 and 3. The manufacturing apparatus MA1 is an apparatus in which the optical element 1 with a paraelectric crystal S is placed on the second pressure heater block 3 and the first pressure heater block 2 is mounted on the optical element 1, whereby pressure is applied through the first pressure heater block 2 to the optical element 1 so as to pressurize the paraelectric crystal S. The pressurizing process by the first pressure heater block 2 may be carried out, for example, by connecting it to a drive controlling device.

Each of the first and second pressure heater blocks 2, 3 has a nearly rectangular parallelepiped shape. The first and second pressure heater blocks 2, 3 also function as heaters.

The optical element 1 is provided with the paraelectric crystal S, a first presser 10, a second presser 20, fasteners 30A-30D, and position fixing devices 40A-40D. The optical element 1 has a sandwich structure in which the paraelectric crystal S is sandwiched in between the first and second pressers 10, 20. The first and second pressers 10, 20, face each other and the fasteners 30A-30D fix the spacing between them. When the first and second pressers 10, 20 are fixed to each other so as to fix the spacing between the first and second pressers 10, 20, a predetermined pressure is applied through the first and second pressers 10, 20 to the paraelectric crystal S. When the pressure is applied to the paraelectric crystal S, a stress according to the predetermined pressure is produced in the paraelectric crystal S.

The first presser 10 has a first plate-like member 11, a first support 12, and a first main press member (main press part) 13. The second presser 20 has a second plate-like member 21, a second support 22, and a second main press member (main press part) 23.

Each of principal surfaces of the first and second plate-like members 11, 21 has a rectangular shape the four corners of which are cut. The first plate-like member 11 is shown in FIG. 3. The first and second plate-like members 11, 21 are preferably comprised of a material having sufficient heat resistance and small thermal expansion.

Therefore, the first and second plate-like members 11, 21 may be comprised, for example, of a metal material such as STAVAX (registered trademark) or a ceramic material such as alumina. The principal surfaces of the first and second plate-like members 11, 21 preferably have the same size and shape.

There are through holes provided so as to penetrate in the thickness direction, respectively at the four corners of the first plate-like member 11. There are female screws provided so as to penetrate in the thickness direction, respectively at the four corners of the second plate-like member 21. The positions of the respective female screws correspond to the positions of the through holes formed in the first plate-like member 11.

The first and second plate-like members 11, 21 are arranged between the first and second pressure heater blocks 2, 3 so that longitudinal ends of the respective principal surfaces protrude outside the first and second pressure heater blocks 2, 3. All the four through holes at the four corners on the first plate-like member 11 are formed at respective positions outside the first and second pressure heater blocks 2, 3. All the four female screws in the second plate-like member 21 are formed at respective positions outside the first and second pressure heater blocks 2, 3.

The first support 12 is attached onto the principal surface of the first plate-like member 11 on the side where it faces the second presser 20. The first support 12 consists of two rail members 12A and 12B arranged so as to be symmetric with each other with respect to a longitudinal approximate center of principal surfaces of the first plate-like member 11. The rail member 12A is attached on the –X side in FIGS. 1 and 2 with respect to the longitudinal approximate center of the principal surfaces of the first plate-like member 11. The rail member 12B is attached on the +X side in FIGS. 1 and 2 with respect to the longitudinal approximate center of the principal surfaces of the first plate-like member 11. Each of the rail members 12A, 12B extends along the transverse direction of the first plate-like member 11.

The second support 22 is attached onto the principal surface of the second plate-like member 21 on the side where it faces the first presser 10. The second support 22 consists of two rail members 22A and 22B arranged so as to be symmetric with each other with respect to a longitudinal approximate center of principal surfaces of the second plate-like member 21. The rail member 22A is attached on the –X side in FIGS. 1 and 2 with respect to the longitudinal approximate center of the principal surfaces of the second plate-like member 21. The rail member 22B is attached on the +X side in FIGS. 1 and 2 with respect to the longitudinal approximate center of the principal surfaces of the second plate-like member 21. Each of the rail members 22A, 22B extends along the transverse direction of the second plate-like member 21.

As shown in FIG. 2, each of sectional shapes along the line II-II of the rail members 12A, 12B of the first support 12 and the rail members 22A, 22B of the second support 22 is a combinational shape of a rectangle located on the first and second plate-like member 11, 21 side and a trapezoid sharing one side with the rectangle. The trapezoids in the sectional shapes along the line II-II of the respective rail members 12A, 12B of the first support 12 have a taper shape the width of which becomes narrower toward the first plate-like member 11. On the other hand, the trapezoids in the sectional shapes along the line II-II of the respective rail members 22A, 22B of the second support 22 have a taper shape the width of which becomes narrower toward the second plate-like member 21.

Each of the first and second main press members 13, 23 has a rod shape of a hexagonal section extending along the transverse direction of the first and second plate-like members 11, 21. As shown in FIG. 2, each of sectional shapes along the line II-II of the first and second main press members 13, 23 is a combinational shape of a rectangle located on the first and second plate-like member 11, 21 side and a trapezoid sharing one side with the rectangle. The trapezoid in the sectional shape along the line II-II of the first main press member 13 has a taper shape the width of which becomes narrower in a direction away from the first plate-like member 11. On the other hand, the trapezoid in the sectional shape along the line II-II of the second main press member 23 has a taper shape the width of which becomes narrower in a direction away from the second plate-like member 21.

The first and second main press members 13, 23 are supported by the first and second supports 12, 22, respectively. Specifically, each of the first and second main press members 13, 23 is engaged with two rail members 12A, 12B; 22A, 22B of the first and second supports 12, 22, as shown in FIG. 2. Therefore, the first and second main press members 13, 23 to be engaged with the two rail members 12A, 12B; 22A, 22B of the respective first and second supports 12, 22 can be moved along the rail members 12A, 12B; 22A, 22B to be attached to or detached from the first and second supports 12, 22.

The first and second main press members 13, 23 both include respective surfaces 13a, 23a that are opposed to each other through the paraelectric crystal S and that are in direct contact therewith. Each of the surfaces 13a, 23a of the first and second main press members 13, 23 in contact with the paraelectric crystal S is formed so as to cover the entire surface of the paraelectric crystal S.

The fasteners 30A-30D fix the first plate-like member 11 and the second plate-like member 21 arranged opposite to each other through the paraelectric crystal S, to each other. Namely, the fasteners 30A-30D fix the spacing between the first and second plate-like members 11, 21. This results in fixing the spacing between the first and second main press members 13, 23.

The fasteners 30A-30D have bolts 31A-31D and washers 32A-32D, respectively.

Each bolt 31A-31D passes through the through hole formed in the first plate-like member 11, so as to extend from the first plate-like member 11 toward the second plate-like member 21, and is mated with the female screw formed in the second plate-like member 21. Namely, the female screws provided at the four corners of the second plate-like member 21 also function as the fasteners 30A-30D together.

The position fixing devices 40A-40D have heat insulation collars 41A-41D and pins 42A-42D, respectively. The heat insulation collars 41A-41D each are fixed to the first plate-like member 11. Each heat insulation collar 41A-41D has a columnar shape and one bottom surface thereof is attached to the first plate-like member 11 so as to contact the first plate-like member 11. The heat insulation collars 41A-41D are comprised of a material having sufficient heat resistance and extremely small thermal conductivity.

The heat insulation collars 41A, 41B are arranged between the bolts 31A, 31B and the rail member 12A of the first support 12. The heat insulation collars 41A, 41B are arranged so that the paraelectric crystal S is located between them, when viewed in the longitudinal direction of the first plate-like member 11.

The heat insulation collars 41C, 41D are arranged between the bolts 31C, 31D and the rail member 12B of the first support 12. The heat insulation collars 41C, 41D are arranged so that the paraelectric crystal S is located between them, when viewed in the longitudinal direction of the first plate-like member 11.

The pins 42A-42D each are fixed to the second plate-like member 21. Each pin 42A-42D has a columnar shape with the bottoms of the same size as the heat insulation collars 41A-41D and is attached to the second plate-like member 21 so that one bottom thereof is in contact with the second plate-like member 21. The pins 42A-42D are arranged at such positions that when the second plate-like member 21 faces the first plate-like member 11, they are engaged with the respective heat insulation collars 41A-41D, each pair constituting one circular cylinder. Namely, the heat insulation collars 41A-41D are coupled in series with the respective pins 42A-42D. The pins 42A-42D are comprised of a material having sufficient heat resistance.

The first and second main press members 11, 21 are arranged so that each heat insulation collar 41A-41D forms one circular cylinder together with the corresponding pin 42A-42D, between them. For this reason, the position fixing devices 40A-40D having the heat insulation collars 41A-41D and the pins 42A-42D can fix relative positions between the first and second pressers 10, 20. The heat insulation collars 41A-41D act to increase heat transfer resistance between the first and second pressers 10, 20.

As apparent from FIGS. 1 and 2, when the paraelectric crystal S is viewed in the X- and Y-directions with the paraelectric crystal S being held by the first and second pressers 10, 20, there is nothing located except for the paraelectric crystal S on either of a straight line along the X-direction and a straight line along the Y-direction. Namely, the optical element 1 has opening portions along the X-direction and the Y-direction. The X-direction and Y-direction are perpendicular to a straight line direction (Z-direction) to connect the first and second plate-like members 11, 21 by the shortest distance.

Figure 4:
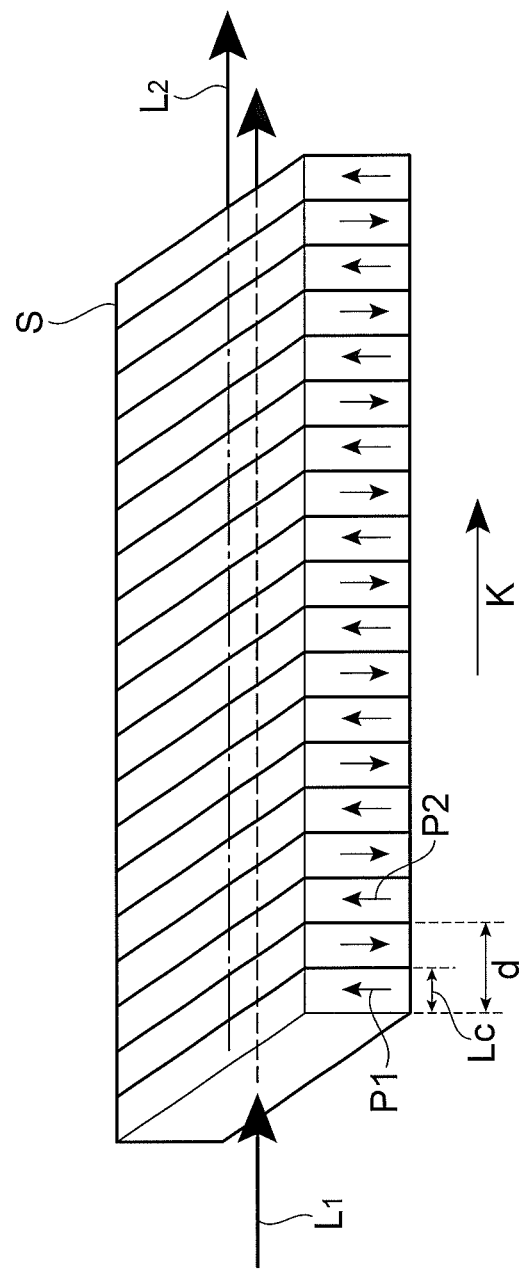
FIG. 4 is an exemplary drawing for explaining a periodic polarity inversion structure formed in a crystal.

The paraelectric crystal S consists of quartz crystal that is a paraelectric material with a periodic structure in which polarities are periodically inverted along a polarity period direction. Namely, in the paraelectric crystal S, as shown in FIG. 4, the periodic structure is formed such that polarities are periodically inverted along the polarity period direction K. In the paraelectric crystal S polarities are inverted at intervals of coherence length Lc, as indicated by arrows P1, P2 in FIG. 4. Therefore, the inversion period d of polarities is twice the coherence length Lc. In this configuration, when a fundamental wave $L_1$ is made incident into the paraelectric crystal S along the direction in which the inversion period of polarities appears, phase matching is achieved so as to enable generation of a second harmonic $L_2$. Namely, the paraelectric crystal S functions as a quasi-phase matching element to avoid the cancellation of second harmonics with each other.

In the optical element 1, the spacing between the first and second pressers 10, 20 is fixed by the position fixing devices 40A-40D, whereby the predetermined pressure is applied through the first and second pressers 10, 20 to the paraelectric crystal S along a direction intersecting with the polarity period direction K, more preferably, along a direction nearly perpendicular thereto.

The paraelectric crystal S is preferably arranged so that the polarity period direction K thereof is parallel to the X-direction or the Y-direction in FIGS. 1 to 3.

Figure 5:
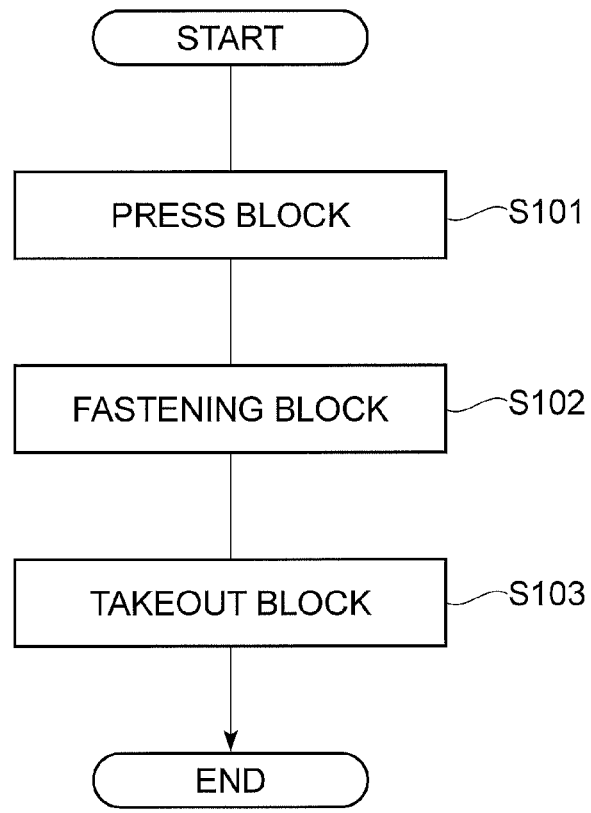
FIG. 5 is an exemplary flowchart for explaining a production method of the optical element according to the first embodiment.

Next, the production method of the optical element according to the present embodiment will be described with reference to FIG. 5. FIG. 5 is an exemplary flowchart for explaining the production method of the optical element according to the present embodiment.

First, the paraelectric crystal S is placed between the first and second main press members 13, 23 of the first and second pressers 10, and the paraelectric crystal S is pressed under the predetermined pressure through the first and second pressers 10, 20 along the straight line direction to connect the first and second pressers 10, 20 by the shortest distance (press block S101).

Specifically, the paraelectric crystal S sandwiched between the first and second pressers 10, 20 is first prepared. Namely, the paraelectric crystal S is mounted on the second main press member 23 of the second presser 20 and the first presser 10 is further mounted on the paraelectric crystal S so that a part of the first main press member 13 is brought into contact with the paraelectric crystal S. This block results in obtaining the paraelectric crystal S sandwiched in between the first and second pressers 10, 20.

In the process of mounting the first presser 10 onto the paraelectric crystal S, the heat insulation collars 41A-41D on the first plate-like member 11 are brought into engagement with the pins 42A-42D on the second plate-like member 21.

The paraelectric crystal S sandwiched in between the first and second pressers 10, 20, obtained as described above, is mounted on the top surface of the second pressure heater block 3 so that the paraelectric crystal S is located on the opposite side to the second pressure heater block 3. Next, the first pressure heater block 2 is mounted on the first presser 10. Then the first pressure heater block 2 is pushed by a pressurizing device (not shown) using a pneumatic cylinder or a hydraulic cylinder, whereby pressure is gradually applied to the first plate-like member 11 of the first presser 10. When the first pressure heater block 2 is pushed to pressurize the first and second pressers 10, 20, the paraelectric crystal S is pressed under the predetermined pressure (press block S101). On this occasion, it is preferable to apply a lubricant such as molybdenum disulfide to between the first pressure heater block 2 and the first presser 10 and to between the second pressure heater block 3 and the second presser 20. Since the application of lubricant ensures freedom for sliding directions between each pair of the pressure heater blocks and the pressers, even if there occurs lateral positional deviation between the first pressure heater block 2 and the second pressure heater block 3, there will be no change in the direction of pressure on the crystal, so as to ensure accurate formation of the periodic structure.

In the press block S101 herein, while the first and second plate-like members 11, 21 are heated so that the first presser 10 becomes hotter than the second presser 20, the first pressure heater block 2 is pushed to apply the pressure to the first plate-like member 11. Namely, in the press block S101, the paraelectric crystal S is pressed through the first and second pressers 10, 20 in a state in which the paraelectric crystal S has a temperature difference between the first presser 10 side and the second presser 20 side.

There are projections and depressions periodically formed in the surface opposed to the paraelectric crystal S, of the first main press member 13 of the first presser 10 at relatively higher temperature. For this reason, as the first pressure heater block 2 is pushed to apply the pressure to the first plate-like member 11, the periodic projections formed in the first main press member 13 press the paraelectric crystal S. The projections and depressions of the first main press member 13 are preferably formed so that the period thereof is set along the X-direction or the Y-direction.

Next, whether the periodic polarity inversion structure is formed along the same period direction as the period direction of the projections and depressions of the first main press member 13, in the paraelectric crystal S is visually checked by the cross-Nicol method. On that occasion, for example, it is checked by viewing the paraelectric crystal S from a direction perpendicular to the period direction of the projections and depressions of the first main press member 13. The polarity period direction K which is the period direction of the periodic polarity inversion structure formed in the paraelectric crystal S, is determined by the period direction of the projections and depressions of the first main press member 13.

After confirming that the periodic polarity inversion structure is formed in the paraelectric crystal S, the bolts 31A-31D of the fasteners 30A-30D are then fastened. This fastening operation results in fixing the spacing between the first and second pressers 10, 20 and, more specifically, the spacing between the first and second main press members 11, 21 is fixed by the fasteners 30A-30D (fastening block S102). At this time, the spacing between the first and second pressers 10, 20 fixed by the fasteners 30A-30D corresponds to the pressure to form the periodic polarity inversion structure in the paraelectric crystal S. The fixing of the spacing between the first and second pressers 10, by the fasteners 30A-30D can be carried out without waiting for cooling of the first and second pressers 10, 20 by temperature control.

After the fastening block S102, the paraelectric crystal S held by the first and second pressers 10, 20 is taken out together with the first and second pressers 10, 20 from between the first and second pressure heater blocks 2, 3 (takeout block S103). At this time, the first and second pressers 10, 20 are kept with the spacing fixed by the fasteners 30A-30D. Then the paraelectric crystal S held by the first and second pressers 10, 20, thus taken out, can be used as an element in a naturally cooled state as it is.

In the optical element 1, the spacing between the first and second pressers 10, 20, more specifically, the spacing between the first and second main press members 13, 23, is fixed by the fasteners 30A-30D, in the state in which the periodic polarity inversion structure is formed in the paraelectric crystal S. For this reason, the optical element 1 becomes able to continuously apply the pressure necessary for formation and maintenance of the periodic polarity inversion structure, to the paraelectric crystal S. The fastening block S102 can also be carried out at the same time as and in parallel with the takeout block S103. Namely, the bolts 31A-31D are fastened to slightly increase a load on the paraelectric crystal S and at the same time as it or in succession thereto, the load applied to the pressure heater blocks 2, 3 is reduced by the same degree. The above block is repeated up to a final state in which the entire load is applied by the bolts 31A-31D, and thereafter the paraelectric crystal S is taken out together with the first and second pressers 10, 20 from between the first and second pressure heater blocks 2, 3. According to this procedure, while maintaining the state in which the periodic polarity inversion structure is formed in the paraelectric crystal S, the load having been applied by the pressure heater blocks 2, 3 can be smoothly replaced with the load by the pressers 10, 20.

In the optical element 1, therefore, the polarity inversion structure in the paraelectric crystal S obtained by external force does not disappear, and can exist on a permanent basis in the paraelectric crystal S. Namely, in the paraelectric crystal S which is the paraelectric material without any physical mechanism for stabilization of the inversion state, the polarity inversion state can be made stabilized in terms of energy.

This makes it feasible to readily provide the quasi-phase matching element made of the paraelectric material, on a stable basis. As a result, the present embodiment solves and improves the biggest problem in element development and production, that a lot of work is needed for search for experimental parameters in each of periods and element sizes during element production in order to make the polarity inverted domains remain and it is also difficult to reproduce, and the present embodiment can largely expand the potential of wavelength conversion elements. Since the present embodiment facilitates development of elements with a short periodic structure harder to make the polarity inversion structure remain, particularly, elements with the periodic structure in the period of not more than 10 μm, it can largely advance development of elements for short wavelength generation such as vacuum ultraviolet light.

The projections and depressions are periodically formed in the first main press member 13 of the first presser 10. For this reason, the first presser 10 presses the paraelectric crystal S by only the projection portions formed periodically. Therefore, the paraelectric crystal S with the periodic polarity inversion structure can be obtained easily.

The formation of the polarity inversion structure is preferably to form it from one end side to the other end side of the paraelectric crystal S opposite thereto. Therefore, by making use of the property that polarities become more likely to invert in higher temperature phase, there is provided the temperature difference between the first and second pressers 10, 20 with the paraelectric crystal S in between, whereby the polarity inversion structure can be created from the first presser 10 side at higher temperature.

The optical element 1 is provided with the position fixing devices 40A-40D to fix the relative positional relation between the first and second pressers 10, 20. It becomes feasible to prevent the first and second pressers 10, 20 from deviating from each other during the application of pressure to the first and second pressers.

In the optical element 1, when the paraelectric crystal S is viewed in the X-direction and the Y-direction perpendicular to the straight line direction (Z-direction) to connect the first and second plate-like members 11, 21 of the first and second pressers 10, 20 by the shortest distance, there is nothing located except for the paraelectric crystal S on the straight lines along the X-direction and the Y-direction. For this reason, there are no barriers in the visual field in observing the optical element in the X-direction or in the Y-direction, which is preferable. When light is made incident along the X-direction or the Y-direction into the paraelectric crystal S, the present embodiment is suitable for use because there are no barriers on the travel passage of light. The light is preferably made incident along the polarity period direction K of the paraelectric crystal S.

The fastening by the fasteners 30A-30D is preferably carried out after gradual cooling of the optical element 1 to some extent, because necessary torque by screwing (external force applied) becomes much smaller. However, the polarity inversion structure can be made to remain even with a sudden drop of temperature and pressure.

The paraelectric crystal S is quartz crystal. Quartz crystal has its absorption edge wavelength of not more than 150 nm. For this reason, the quasi-phase matching element obtained by use of quartz crystal can generate the second harmonic at the short wavelength of not more than 200 nm.

Figure 6A:
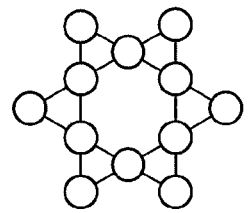
FIG. 6A is an exemplary drawing showing high temperature phase of quartz crystal.
Figure 6B:
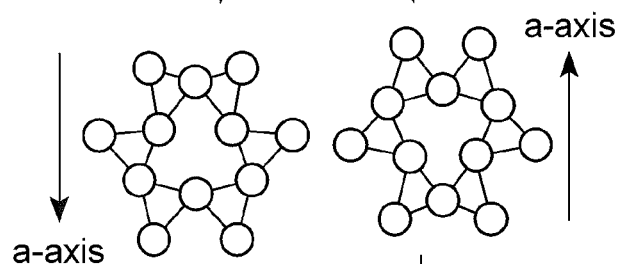
FIG. 6B is an exemplary drawing showing low temperature phase of quartz crystal.
Figure 6C:
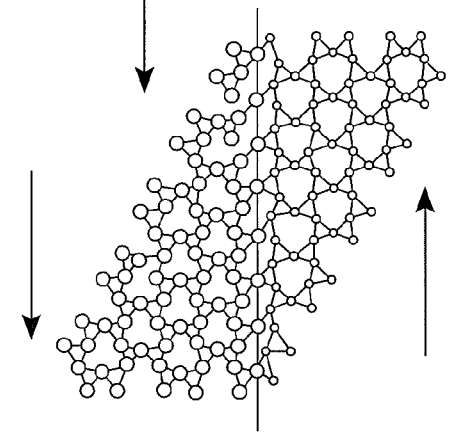
FIG. 6C is an exemplary drawing showing structure of a Dauphine twin of quartz crystal.

The quartz crystal used herein in the production of the inversion structure is a Dauphine twin which is a twin peculiar to quartz crystal. This twin has the inversion structure of a-axis corresponding to the principal axis of nonlinear polarization, which is essential in using quartz crystal as the quasi-phase matching element. The Dauphine twin, as shown in FIGS. 6A to 6C, is known as a twin generated in phase transition of β-quartz (high temperature phase) of quartz crystal into α-quartz (low temperature type), which has a twin axis of c-axis and in which two domains in a twin relation are in a 180° rotation relation with their a-axes being inverted from each other. The high temperature phase of quartz crystal is a high temperature type quartz hexagonal system and the low temperature phase of quartz crystal is a low temperature type quartz trigonal system. The Dauphine twin is a twin whose twin axis is the c-axis.

The twin is formed by making use of change of Gibbs energy of system in conjunction with application of external force. This makes use of the property that in increase of Gibbs energy of system due to press, energy increase can be smaller with rotation of crystal orientation into the twin than without rotation in the original state. A variation of the Gibbs energy of system is expressed by formula (1) below.

$$G = -\left(\int \sum_{k=1}^{3}\sum_{l=1}^{3} S_{kl} dT_{kl} + \int \sum_{i=1}^{3} D_i dE_i + \int \sum_{i=1}^{3} B_i dH_i\right) - \int \kappa_{Entpopy} d\Theta_{Temp} \quad (1)$$

In this formula $S_{kl}$ represents strain tensor, $T_{kl}$ stress tensor, $D_i$ electric flux density tensor, $E_i$ electric field tensor, $B_i$ magnetic flux density tensor, $H_i$ magnetic field tensor, $\kappa$ entropy, and $\Theta$ temperature. Since there is no temperature change, magnetic field change, or electric field change, formula (1) can be simplified to formula (2) below.

$$G = -\int \sum_{k=1}^{3}\sum_{l=1}^{3} S_{kl} dT_{kl} \quad (2)$$

Therefore, formula (4) below is obtained from formulas (2) and (3).

$$G = -\frac{1}{2}\sum_{i=1}^{3}\sum_{j=1}^{3}\sum_{k=1}^{3}\sum_{l=1}^{3} s_{klij} T_{ij} T_{kl} \quad (4)$$

On the other hand, when the Dauphine twin is formed with rotation of crystal orientation, a change is made in the tensor component of elastic compliance $s_{ijkl}$ of system. The elastic compliance in this case is defined as $S_{ijkl}$(twin) and a variation of Gibbs energy with generation of the twin (inversion of crystal orientation) as G(twin); then we obtain formula (5) below.

$$G_{(twin)} = -\frac{1}{2}\sum_{i=1}^{3}\sum_{j=1}^{3}\sum_{k=1}^{3}\sum_{l=1}^{3} s_{klij(twin)} T_{ij} T_{kl} \quad (5)$$

The condition for generation of the twin is that G(twin) becomes smaller than G. Therefore, the stress tensor component is selected so that formula (6) below becomes negative, i.e., crystal orientation for press is so selected, whereby we can achieve the generation of the twin, the rotation of crystal orientation in conjunction therewith, and the reversal of polar axis (a-axis) resulting therefrom.

$$\Delta G = G_{(twin)} - G = -\frac{1}{2}\sum_{i=1}^{3}\sum_{j=1}^{3}\sum_{k=1}^{3}\sum_{l=1}^{3} (s_{klij(twin)} - s_{klij}) T_{ij} T_{kl} \quad (6)$$

By making use of this principle, it becomes feasible to form the periodic polarity inversion structure in a single crystal of quartz crystal. It is also feasible to generate higher harmonics by the quasi-phase matching element using the quartz crystal in which the periodic polarity inversion structure is formed.

The polarity inversion forming technology making use of the change of Gibbs energy in conjunction with the application of external force as described above is the technology with great potential to also enable formation of the periodic polarity inversion structure in many paraelectric materials with which the electric field application polarization reversal used to be impossible, and to enable production of the quasi-phase matching elements as a result.

In the case of a polarization inversion structure of a ferroelectric material, since the ferroelectric material has spontaneous polarization, reversal of spontaneous polarization occurs between adjacent domains. As a result, it becomes possible to promote stabilization of the inversion structure by production of electrostatic energy decrease in the ferroelectric material.

On the other hand, in the case of the periodic polarity inversion structure of the paraelectric material, there are many walls of adjacent polarity inverted domains in a single crystal and it brings down a disadvantage in terms of energy when compared to the state before reversal. Namely, the existence of walls of adjacent polarity inverted domains can act as a driving force to again invert once-inverted domains into the original state without existence of domain walls, while exceeding activation energy for re-inversion. Therefore, the electrostatic energy stabilization as in the case of the polarization inversion structure of the ferroelectric material cannot occur in the polarity inversion structure of the paraelectric material without spontaneous polarization. For this reason, the paraelectric material has the problem that the re-inversion of inverted domains occurs easily and the periodic polarity inversion structure is likely to disappear in conjunction therewith.

This can be discussed as follows as energy stored in system. The system energy of the periodic polarity inversion structure produced by the external force application polarity inversion making use of the paraelectric material can be expressed by formula (7) below.

$$\Delta G + \sum_{i=1}^{n} \gamma^{i}_{Domain-Wall} = -\frac{1}{2}\sum_{i=1}^{3}\sum_{j=1}^{3}\sum_{k=1}^{3}\sum_{l=1}^{3}(s_{klij(twin)} - s_{klij})T_{ij}T_{kl} + \sum_{i=1}^{n}\gamma^{i}_{Domain-Wall} \quad (7)$$

In this formula, $\gamma^{i}_{Domai-wall}$ represents interface energy due to the ith domain wall and the system energy increases with increase in the number of i, becoming the driving force for re-inversion of inverted domains (disappearance of inversion structure).

On the other hand, the system energy of the periodic polarization inversion structure produced by the electric field application polarization inversion making use of the ferroelectric material can be expressed by formula (8) below.

$$-\sum_{j=1}^{3}P_j^{Spontaneous}E_j - \frac{1}{2}\sum_{i=1}^{3}\sum_{j=1}^{3}(\varepsilon_{ij(twin)} - \varepsilon_{ij})E_iE_j + \sum_{i=1}^{n}\gamma^{i}_{Domain-Wall} - \sum_{j=1}^{n-1}\eta^{j}_{Domain} \quad (8)$$

In this formula, $P_j^{Spontanouss}$ represents the jth component of tensor of spontaneous polarization, $\in_{ij}$ dielectric tensor, and $\eta_{Domain}^{i}$ electrostatic stabilization energy due to generation of domains.

When formula (7) is compared with formula (8), it is seen that there is a significant difference in the system energy in removal of the external force for production of the periodic structure, i.e., in a state in which the element becomes free from the manufacturing apparatus. In the external force application polarity inversion using the paraelectric material as an element, when the applied pressure $T_{kl}$ as external force is turned to 0, the system energy changes from formula (7) to formula (9) below.

$$\sum_{i=1}^{n}\gamma^{i}_{Domain-Wall} \quad (9)$$

It is seen from formula (9) that the system energy increases by the number of domain walls.

On the other hand, in the electric field application polarization inversion using the ferroelectric material, when the applied electric field $E_j$ as external force is turned to 0, the system energy changes to formula (10) below.

$$\sum_{i=1}^{n}\gamma^{i}_{Domain-Wall} - \sum_{i=1}^{n-1}\eta^{j}_{Domain} \quad (10)$$

It is understood from formula (10) that in this case, reduction of system energy due to electrostatic energy is also shown while the system energy increases by the number of domain walls.

Therefore, the possibility that the inverted domains are again inverted over the activation energy for re-inversion, i.e., the possibility of disappearance of the inversion structure is much higher in the polarity inversion structure using the paraelectric material than in the polarization inversion structure using the ferroelectric material.

As discussed above, it can be confirmed by the above theory that it is difficult to keep the once-formed inverted domains remaining in the periodic polarity inversion structure produced by the external force application polarity inversion. Therefore, a lot of work is needed for search for experimental parameters in each of periods and element sizes, and it is also difficult to reproduce. Therefore, to maintain the periodic polarity inversion structure is extremely effective in development and production of element.

In the case of use of the paraelectric material, as described above, different from the case of use of the ferroelectric material for which the energy stabilization mechanism of inversion structure by electrostatic energy exists, there is no physical mechanism for stabilization of the inversion state in the formed polarity inversion structure. In contrast to it, application of system Gibbs energy change by application of external force is the most rational to the method of energy stabilization of the polarity inversion state in the paraelectric material without existence of spontaneous polarization.

Then the inventors considered that for stabilization of the inversion structure in terms of energy, the element of paraelectric material with the inversion structure once formed was continuously kept under application of external force to continuously maintain the energy stabilization mechanism of inverted domains. In this case, the most effective way is to keep application of external force to the element by a separate mechanism different from the load of the manufacturing apparatus, from the point immediately after the production of the inversion structure.

As a result of study, we also discovered that the external force necessary for stabilization of the inversion structure after formation of the inversion structure by the manufacturing apparatus could be much smaller than the external force during the production.

In the present embodiment the first and second plate-like members 11, 21 are sandwiched between the first and second pressure heater blocks 2, 3 of the manufacturing apparatus MA1 and the paraelectric crystal S, whereby the paraelectric crystal S is pressed indirectly through the first and second plate-like members 11, 21 by the manufacturing apparatus MA1. The system energy increase of the paraelectric crystal S in the present embodiment is given by formula (11) below.

$$-\frac{1}{2}\sum_{i=1}^{3}\sum_{j=1}^{3}\sum_{k=1}^{3}\sum_{l=1}^{3}(s_{klij(twin)} - s_{klij})T_{ij}T_{kl} + \sum_{i=1}^{n}\gamma^{i}_{Domain-Wall} \quad (11)$$

As apparent from a comparison between formula (9) and formula (11), it becomes feasible to add an energy decrease term in the system of the paraelectric crystal S in the optical element 1 according to the present embodiment. In this case, since the quantity of $T_{kl}$ in formula (11) can be controlled by adjusting torques of the fasteners 30A-30D, it also becomes feasible to achieve energy control of the system according to circumstances.

Figure 7:
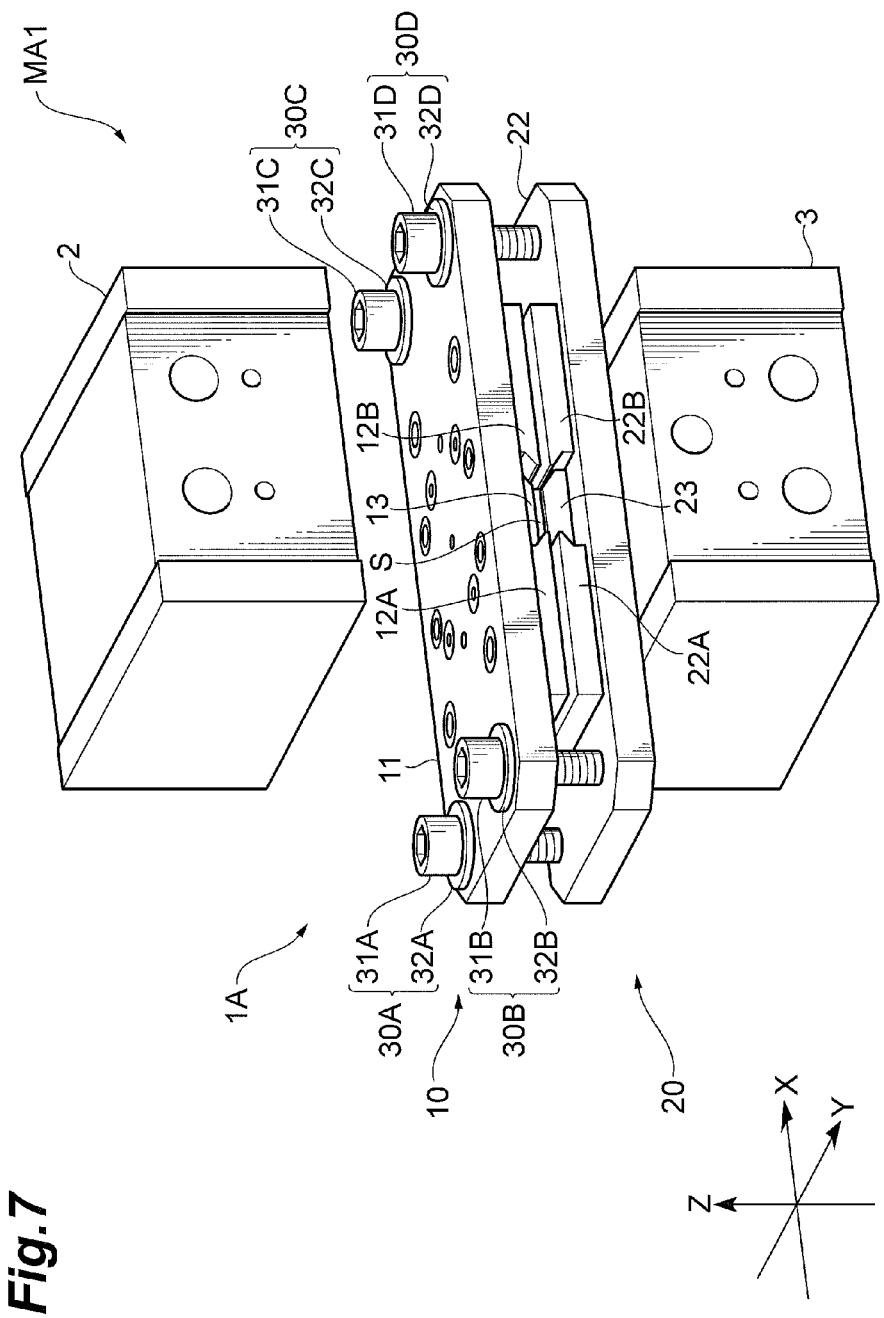
FIG. 7 is an exemplary exploded perspective view of a modification example of the optical element and manufacturing apparatus thereof according to the first embodiment.

FIG. 7 shows an exemplary exploded perspective view of a modification example of the optical element and manufacturing apparatus thereof according to the first embodiment. The optical element 1A according to the modification example of the first embodiment is not provided with the position fixing devices 40A-40D, as shown in FIG. 7. In this case, as shown in FIG. 7, the X-directional width of the rail members 12A, 12B, 22A, 22B of the first and second supports 12, 22 may be longer than that in the case of the optical element 1 according to the first embodiment. The length from the −X-side end of the rail member 12A to the +X-side end of the rail member 12B is preferably the same as the X-directional width of the first pressure heater block 2. The length from the −X-side end of the rail 22A to the +X-side end of the rail 22B is preferably the same as the X-directional width of the second pressure heater block 3.

Second Embodiment

A configuration of an optical element 5 and a production method thereof according to the second embodiment will be described with reference to FIGS. 8 to 10. The optical element 5 of the second embodiment is different from the optical element 1 of the first embodiment in that the optical element 5 is supported by a press support device.

Figure 8:
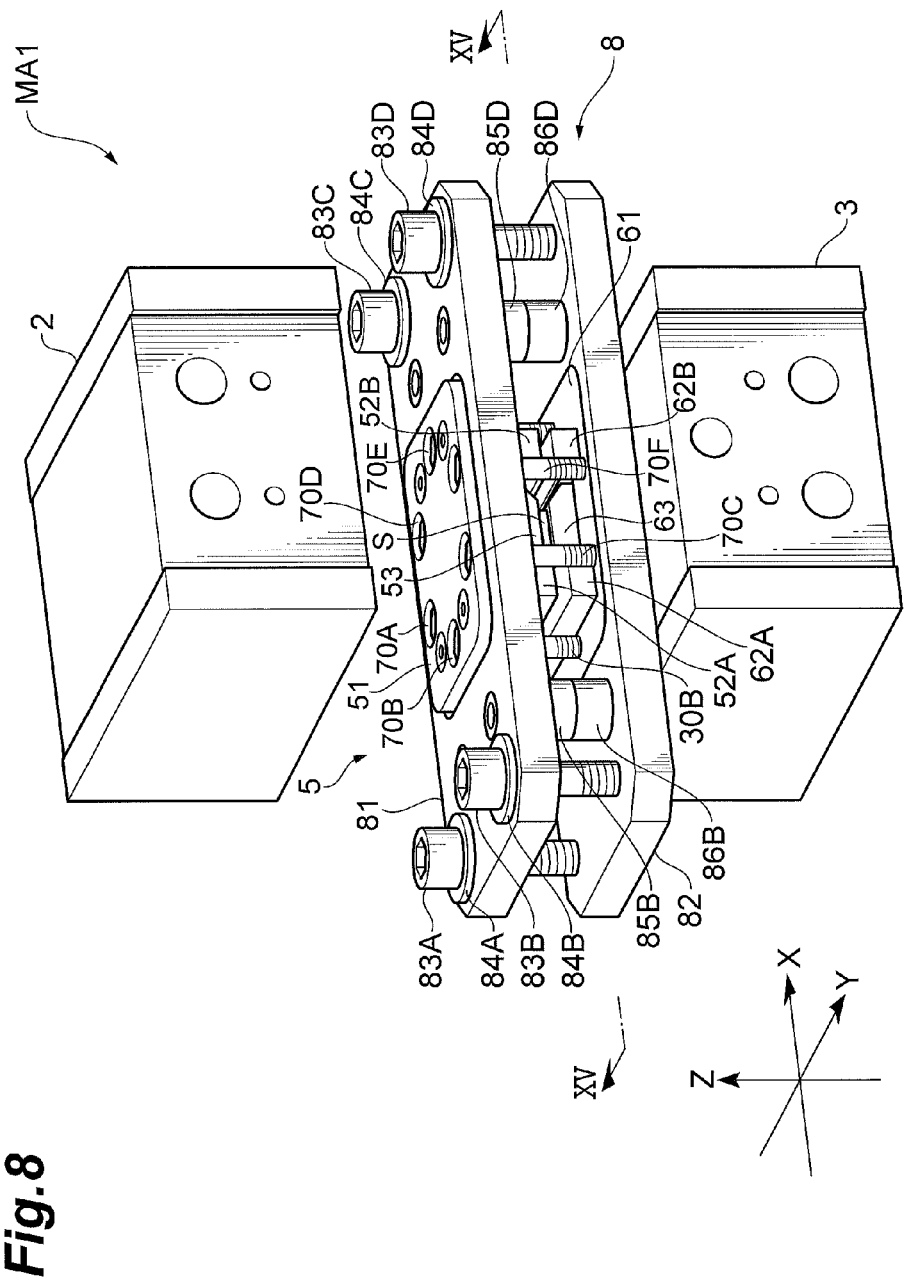
FIG. 8 is an exemplary exploded perspective view of an optical element and a manufacturing apparatus thereof according to the second embodiment.

FIG. 8 is an exemplary exploded perspective view of the optical element and manufacturing apparatus thereof according to the second embodiment. FIG. 9 is an exemplary sectional view along the line XV-XV in FIG. 8. FIG. 10 is an exemplary top plan view of a part of the optical element and manufacturing apparatus thereof according to the second embodiment.

The manufacturing apparatus MA1 is provided with first and second pressure heater blocks (pressurizing means) 2 and 3. The optical element 5 with the paraelectric crystal S is supported by the press support device 8. The press support device 8 supports the optical element 5 so as to form an integral body. Then the optical element 5 is arranged between the first and second pressure heater blocks (pressurizing means) 2, 3 in a state in which it is supported by the press support device 8.

The optical element 5 is provided with the paraelectric crystal S, a first presser 50, a second presser 60, and fasteners 70A-70F. The optical element 5 has a sandwich structure in which the paraelectric crystal S is sandwiched in between the first and second pressers 50, 60. The first and second pressers 50, 60 are opposed to each other through the paraelectric crystal S and the spacing between them is fixed by the fasteners 70A-70F. As the spacing between the first and second pressers 50, 60 is fixed, a predetermined pressure is applied to the paraelectric crystal S through the first and second pressers 50, 60. As the pressure is applied to the paraelectric crystal S, a stress corresponding to the pressure is produced in the paraelectric crystal S.

The first presser 50 has a first plate-like member 51, a first support 52, and a first main press member 53. The second presser 60 has a second plate-like member 61, a second support 62, and a second main press member 63. The principal surfaces of the first and second plate-like members 51, 61, as shown in FIG. 10, have a nearly longitudinal shape rounded at the four corners. The principal surfaces of the first and second plate-like members 51, 61 preferably have the same size and shape.

Figure 10:
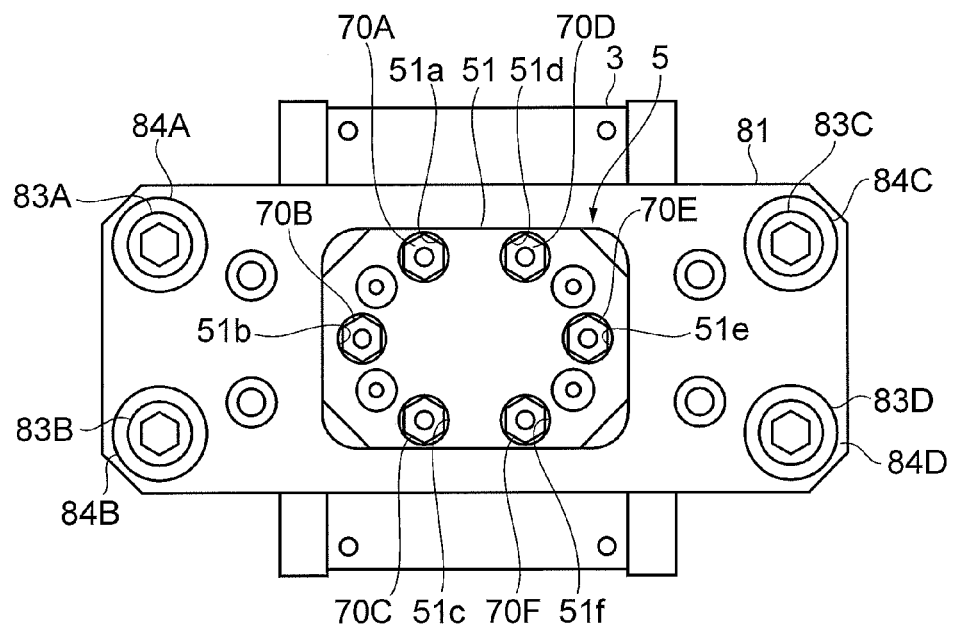
FIG. 10 is an exemplary top plan view of a part of the optical element and manufacturing apparatus thereof according to the second embodiment.
Figure 10:
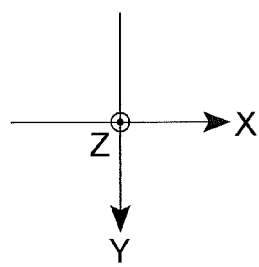

The first plate-like member 51, as shown in FIG. 10, is provided with six through holes 51a-51f penetrating in the thickness direction, around the central position of the principal surfaces. The second plate-like member 61 is provided with female screws penetrating in the thickness direction, at positions corresponding to the through holes 51a-51f of the first plate-like member 51.

The first and second plate-like members 51, 61 are formed so as to be smaller than surfaces of the first and second pressure heater blocks 2, 3 for mounting of the optical element 5.

The first support 52 is attached onto the principal surface of the first plate-like member 51 on the side where it faces the second presser 60. The first support 52 consists of two rail members 52A, 52B arranged so as to be symmetric with each other with respect to a longitudinal approximate center of the principal surfaces of the first plate-like member 51. The second support 62 is attached onto the principal surface of the second plate-like member 61 on the side where it faces the first presser 50. The second support 62 consists of two rail members 62A, 62B arranged so as to be symmetric with each other with respect to a longitudinal approximate center of the principal surfaces of the second plate-like member 61.

Each of the first and second main press members 53, 63 has a rod shape of a hexagonal section extending along the transverse direction of the first and second plate-like members 51, 61.

The first and second main press members 53, 63 are supported by the first and second supports 52, 62, respectively. Specifically, each of the first and second main press members 53, 63, as shown in FIG. 9, is in engagement with two rail members 52A, 52B; 62A, 62B of the first and second supports 52, 62.

The first and second main press members 53, 63 include their respective surfaces 53a, 63a that are opposed to each other through the paraelectric crystal S and that are in direct contact therewith. Each of the surfaces 53a, 63a of the first and second main press members 53, 63 in contact with the paraelectric crystal S is formed so as to cover the entire surface of the paraelectric crystal S.

The fasteners 70A-70F of six bolts fix the principal surface of the first plate-like member 51 and the principal surface of the second plate-like member 61 arranged opposite to each other through the paraelectric crystal S. Namely, the fasteners 70A-70F fix the spacing between the first and second plate-like members 51, 61. This results in fixing the spacing between the first and second main press members 53, 63.

Each fastener 70A-70F penetrates through the through hole formed in the first plate-like member 51, so as to extend from the first plate-like member 51 toward the second plate-like member 61, and is mated with the female screw formed in the second plate-like member 61. Namely, the female screws provided at the six points of the second plate-like member 61 also function as the fasteners 70A-70F together.

Each fastener 70A-70F is located inside a region covered by the first and second pressure heater blocks 2, 3, in the first and second plate-like members 51, 61 when the first and second pressers 50, 60 are arranged between the first and second pressure heater blocks 2, 3.

Figure 9:
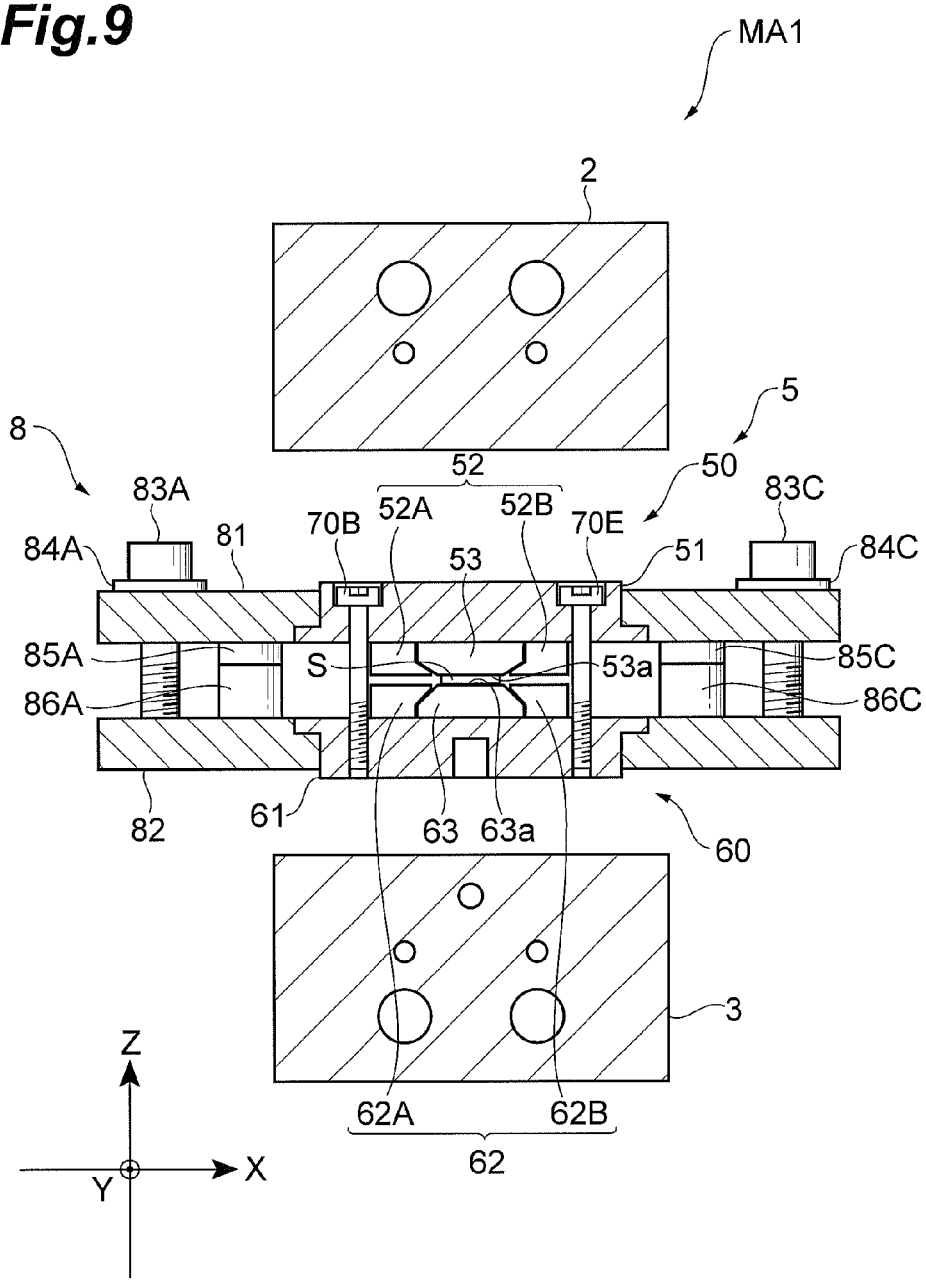
FIG. 9 is an exemplary sectional view along the line XV-XV in FIG. 8.

As apparent from FIGS. 8 and 9, when the paraelectric crystal S is viewed in the Y-direction with the paraelectric crystal S being held by the first and second pressers 50, 60, there is nothing located except for the paraelectric crystal S on a straight line along the Y-direction. Namely, the optical element 5 has an opening portion along the Y-direction. The Y-direction is perpendicular to a straight line direction (Z-direction) to connect the first and second plate-like members 51, 61 by the shortest distance.

The press support device 8 is provided with a first press support plate 81, a second press support plate 82, bolts 83A-83D, washers 84A-84D, heat insulation collars 85A-85D, and pins 86A-86D.

The first and second press support plates 81, 82 are plate-like members a central part of which opens in a rectangular shape in the thickness direction. The principal surfaces of the first and second press support plates 81, 82, as shown in FIG. 10, have a rectangular shape the four corners of which are cut. The first and second press support plates 81, 82 are preferably comprised of a material having sufficient heat resistance and small thermal expansion as the first and second plate-like members 51, 61 are. Therefore, the first and second press support plates 81, 82 may be comprised, for example, of a metal material such as STAVAX (registered trademark) or a ceramic material such as alumina.

The first plate-like member 51 is fitted in the opening part of the first press support plate 81, thereby forming an integral plate shape. As shown in FIG. 9, steps are formed in a mating relation in the side face of the opening part of the first press support plate 81 and in the side face of the first plate-like member 51, and the first press support plate 81 and the first plate-like member 51 are in engagement with each other through these steps.

The second plate-like member 61 is fitted in the opening part of the second press support plate 82, thereby forming an integral plate shape. As shown in FIG. 9, steps are formed in a mating relation in the side face of the opening part of the second press support plate 82 and in the side face of the second plate-like member 61, and the second press support plate 82 and the second plate-like member 61 are in engagement with each other through these steps.

There are through holes provided so as to penetrate in the thickness direction, at the respective four corners of the first press support plate 81. There are female screws provided so as to penetrate in the thickness direction, at the four corners of the second press support plate 82 and positions corresponding to the respective through holes formed in the first press support plate 81.

The first and second press support plates 81, 82 are arranged between the first and second pressure heater blocks 2, 3 so that the longitudinal ends of the principal surfaces thereof protrude outside the first and second pressure heater blocks 2, 3. All of the four through holes provided at the four corners are formed at respective positions outside the first and second pressure heater blocks 2, 3.

Each bolt 83A-83D passes through the through hole formed in the first press support plate 81, so as to extend from the first press support plate 81 toward the second press support plate 82, and is mated with the female screw formed in the second press support plate 82. Each bolt 83A-83D is located outside a region covered by the first and second pressure heater blocks 2, 3, in the first and second plate-like members 51, 61 and the first and second press support plates 81, 82, when the first and second pressers 50, 60 are arranged between the first and second pressure heater blocks 2, 3.

The heat insulation collars 85A-85D each are fixed to the first press support plate 81. Each heat insulation collar 85A-85D has a columnar shape, one bottom surface of which is attached to the first press support plate 81 so as to contact the first press support plate 81. The heat insulation collars 85A-85D are arranged between the bolts 83A, 83B and the optical element 5. The heat insulation collars 85C, 85D are arranged between the bolts 83C, 83D and the optical element 5.

The pins 86A-86D each are fixed to the second press support plate 82. Each pin 86A-86D has a columnar shape with bottom faces having the same size as the heat insulation collars 85A-85D, one bottom surface of which is attached to the second press support plate 82 so as to contact the second press support plate 82. The pins 86A-86D are arranged at such positions that when the second press support plate 82 is opposed through the paraelectric crystal S to the first press support plate 81, each pin is engaged with each heat insulation collar 85A-85D to form one circular cylinder. The pins 86A-86D are comprised of a material having sufficient heat resistance.

The first and second press support plates 81, 82 are arranged so that between them each heat insulation collar 85A-85D forms a circular cylinder together with the corresponding pin 86A-86D. For this reason, the heat insulation collars 85A-85D and the pins 86A-86D can fix the relative positions between the first and second press support plates 81, 82.

As apparent from FIGS. 8 and 9, when the paraelectric crystal S is viewed in the X-direction with the paraelectric crystal S being held by the first and second pressers 50, 60, there is a straight line along the X-direction on which nothing is located except for the paraelectric crystal S. Namely, the optical element 5 has an opening part along the X-direction. The X-direction is perpendicular to the straight line direction (Z-direction) to connect the first and second plate-like members 51, 61 by the shortest distance.

The paraelectric crystal S is comprised of quartz crystal as a paraelectric material with the periodic structure in which polarities are periodically inverted along the polarity period direction K, as shown in FIG. 4.

Figure 11:
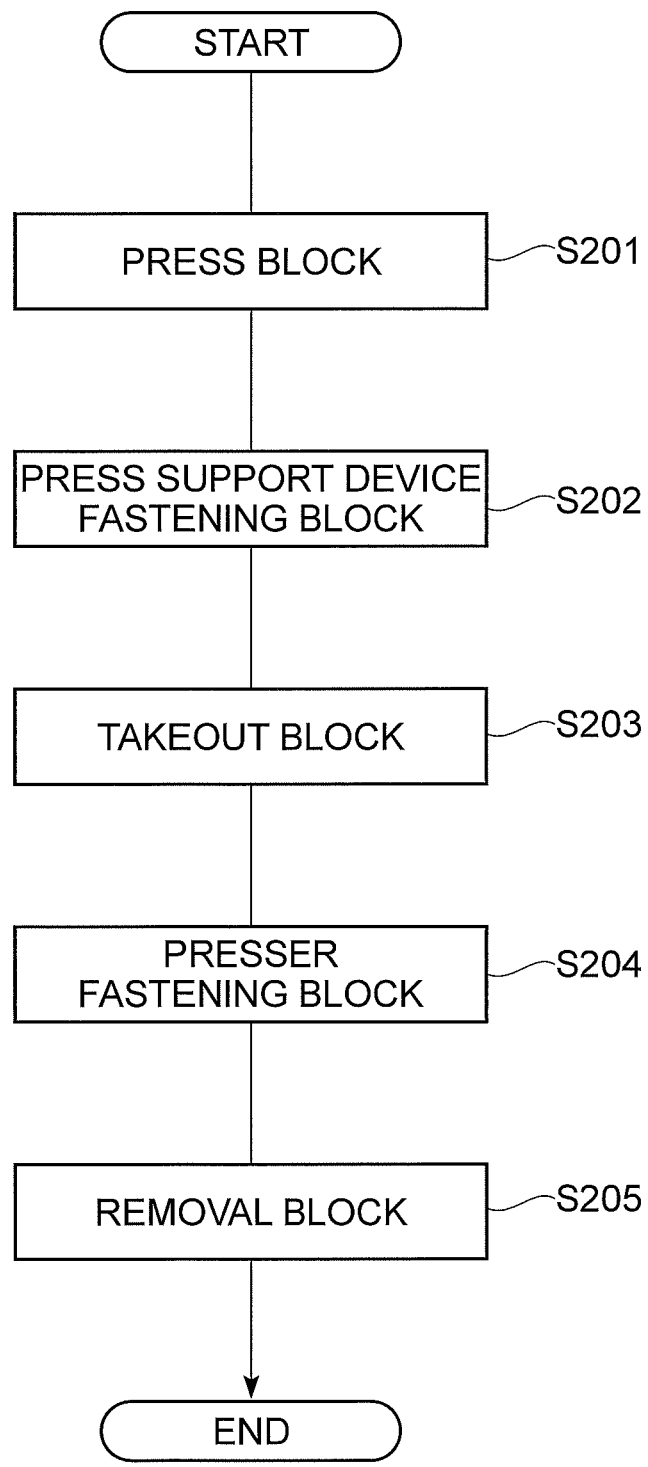
FIG. 11 is an exemplary flowchart for explaining a production method of the optical element according to the second embodiment.

Next, the production method of the optical element according to the present embodiment will be described with reference to FIG. 11. FIG. 11 is an exemplary flowchart for explaining the production method of the optical element according to the present embodiment.

First, the first presser 50 and the first press support plate 81 are brought into engagement with each other, while the second presser 60 and the second press support plate 82 are brought into engagement with each other. Next, the paraelectric crystal S is mounted on the second main press member 63 of the second presser 60 in engagement with the second press support plate 82 and, the first presser 50 in engagement with the first press support plate 81 is further placed on the paraelectric crystal S so that the first main press member 53 is in contact with the paraelectric crystal S. This matter results in obtaining the paraelectric crystal S sandwiched in between the first and second pressers 50, 60. In the operation of mounting the first presser 50 on the paraelectric crystal S, the heat insulation collars 85A-85D provided on the first press support plate 81 are brought into engagement with the corresponding pins 86A-86D provided on the second press support plate 82.

The paraelectric crystal S sandwiched in between the first and second pressers 50, 60, obtained in this manner, is mounted onto the top surface of the second pressure heater block 3 so that the paraelectric crystal S is located on the opposite side to the second pressure heater block 3. Next, the first pressure heater block 2 is mounted on the first presser 50. Then the first pressure heater block 2 is pushed by a pressurizing device (not shown) using a pneumatic cylinder or a hydraulic cylinder, whereby pressure is gradually applied to the first plate-like member 51 of the first presser 50. As the first pressure heater block 2 is pushed to pressurize the first and second pressers 50, 60, the paraelectric crystal S is pressed under a predetermined pressure (press block S201). On this occasion, it is preferable to apply a lubricant such as molybdenum disulfide to between the first pressure heater block 2 and the first plate-like member 51 and to between the second pressure heater block 3 and the second plate-like member 61. Since the application of lubricant ensures freedom for sliding directions between each pair of the pressure heater blocks and the plate-like members, even if there occurs lateral positional deviation between the first pressure heater block 2 and the second pressure heater block 3, there will be no change in the direction of pressure applied to the crystal and thus the periodic structure can be accurately formed.

In the press block S201 herein, while the first and second pressure heater blocks 2, 3 heat the first and second plate-like members 51, 61 so that the first presser 50 becomes hotter than the second presser 60, the first pressure heater block 2 is pushed to apply the pressure to the first plate-like member 51. Namely, in the press block S201, the paraelectric crystal S is pressed through the first and second pressers 50, 60, in a state in which the paraelectric crystal S has a temperature difference between the first presser 50 side and the second presser 60 side.

Projections and depressions are periodically formed in a surface opposed to the paraelectric crystal S, of the first main press member 53 of the first presser 50 at relatively higher temperature. For this reason, the load of the first pressure heater block 2 is applied to the first plate-like member 51, whereby the periodic projections formed in the first main press member 53 are pressed against the paraelectric crystal S. The projections and depressions in the first main press member 53 are preferably formed so that the period thereof is set along the Y-direction.

Next, whether the periodic polarity inversion structure is formed in the paraelectric crystal S is visually checked by the cross-Nicol method. On that occasion, for example, the paraelectric crystal S is viewed from a direction perpendicular to the period direction of the projections and depressions in the first main press member 53 to check it. After it is confirmed that the periodic polarity inversion structure is formed in the paraelectric crystal S, the bolts 83A-83D are then fastened. This process results in fixing the space between the first and second press support plates 81, 82 and further fixing the spacing between the first and second pressers 50, 60 by the bolts 83A-83D (press support device fastening block S202). At this time, the spacing between the first and second press support plates 81, 82 fixed by the bolts 83A-83D corresponds to the pressure to form the periodic polarity inversion structure in the paraelectric crystal S. The fixing of the spacing between the first and second press support plates 81, 82 by the bolts 83A-83D can be carried out without waiting for cooling of the first and second press support plates 81, 82 and the first and second pressers 50, 60 by temperature control.

After the press support device fastening block S202, the optical element 5 is taken out together with the press support device 8 from between the first and second pressurizing devices 2, 3 (takeout block S203). At this time, the spacing between the first and second pressers 50, 60 is fixed by the press support device 8. Then the press support device 8 and the optical element 5 thus taken out are cooled by natural cooling and thereafter the bolts 70A-70D as fasteners of the optical element 5 are fastened. This matter results in fixing the spacing between the first and second pressers 50, 60 and, more specifically, the spacing between the first and second main press members 51, 61 by the fasteners 70A-70F (presser fastening block S204).

Thereafter, the bolts 83A-83D are unfastened and the press support device 8 is removed from the optical element 5 (removal block S205). This matter results in obtaining the optical element 5.

In the optical element 5, the spacing between the first and second pressers 50, 60 and, more specifically, the spacing between the first and second main press members 53, 63 is fixed by the fasteners 70A-70F, in the state in which the periodic polarity inversion structure is formed in the paraelectric crystal S. For this reason, it becomes feasible to continuously apply the pressure necessary for formation and maintenance of the periodic polarity inversion structure, to the paraelectric crystal S in the optical element 5. Therefore, it becomes feasible to maintain the polarity inversion structure in the paraelectric crystal S on a permanent basis in the optical element 5.

The fastening block S202 can also be performed at the same time as and in parallel with the takeout block S203. Namely, the bolts 83A-83D are fastened to slightly increase the load on the paraelectric crystal S and at the same time as it or in succession thereto, the load applied by the pressure heater blocks 2, 3 is reduced by the same degree. The above block is repeated up to a final state in which the entire load is applied by the bolts 83A-83D, and then the paraelectric crystal S is taken out together with the first and second pressers 50, 60 from between the first and second pressure heater blocks 2, 3. According to this procedure, while maintaining the state in which the periodic polarity inversion structure is formed in the paraelectric crystal S, the load applied by the pressure heater blocks 2, 3 can be smoothly replaced with the load by the pressers 50, 60.

The projections and depressions are periodically formed in the first main press member 53 of the first presser 50. For this reason, the first presser 50 presses the paraelectric crystal S by only the projection portions periodically formed. Therefore, the paraelectric crystal S with the periodic polarity inversion structure can be readily obtained.

The formation of the polarity inversion structure is preferably implemented from one end side toward the other end side of the paraelectric crystal S opposed thereto. Therefore, by making use of the property that polarities become more likely to invert in higher temperature phase, a temperature difference is established between the first and second pressers 10, 20 with the paraelectric crystal S in between, whereby the polarity inversion structure can be created from the first presser 50 side at higher temperature.

In the optical element 5, when the paraelectric crystal S is viewed in the Y-direction perpendicular to the straight line direction (Z-direction) to connect the first and second plate-like members 51, 61 of the first and second pressers 50, 60 by the shortest distance, there is the straight line on which nothing is located except for the paraelectric crystal S. For this reason, the present embodiment is suitable for use because there are no barriers on the travel passage of light in the case where the light is made incident along the Y-direction into the paraelectric crystal S. The light is preferably made incident along the polarity period direction K of the paraelectric crystal S.

The paraelectric crystal S is quartz crystal. Therefore, it becomes feasible to generate the second harmonic with the short wavelength of not more than 200 nm.

Since the optical element 5 employs the press support device 8, it can have the pressers 50, 60 smaller than the pressure heater blocks 2, 3. Namely, the fasteners 70A-70F to fix the spacing between the first and second pressers 50, 60 are fastened to maintain the spacing between the first and second pressers 50, 60 during the application of the predetermined pressure by the first and second pressure heater blocks 2, 3. However, with further reduction in the size of the first and second pressers 50, 60, the pressers 50, 60 become smaller than the pressure heater blocks 2, 3, and as a result, the fasteners 70A-70F become sandwiched between the pressure heater blocks 2, 3, during the pressure application by the pressure heater blocks 2, 3. In that case, the fastening of the fasteners 70A-70F cannot be carried out in fact during the application of the required pressure by the pressure heater blocks 2, 3.

Against this problem, it becomes feasible to reduce the size of the pressers 50, 60 by use of the press support device 8 as in the present embodiment. Namely, since the spacing between the first and second pressers 50, 60 is also fixed by fastening of the bolts 83A-83D of the press support device 8, the fasteners 70A-70F can be fastened with the spacing between the first and second pressers 50, 60 being fixed, even after the optical element 5 is taken out from between the first and second pressure heater blocks 2, 3.

Since the press support device 8 is simply fixed by the bolts 83A-83D, it can be readily removed from the optical element 5 by unfastening the bolts 83A-83D. This makes it feasible to utilize the optical element 5 in reduced size.

Third Embodiment

Figure 12:
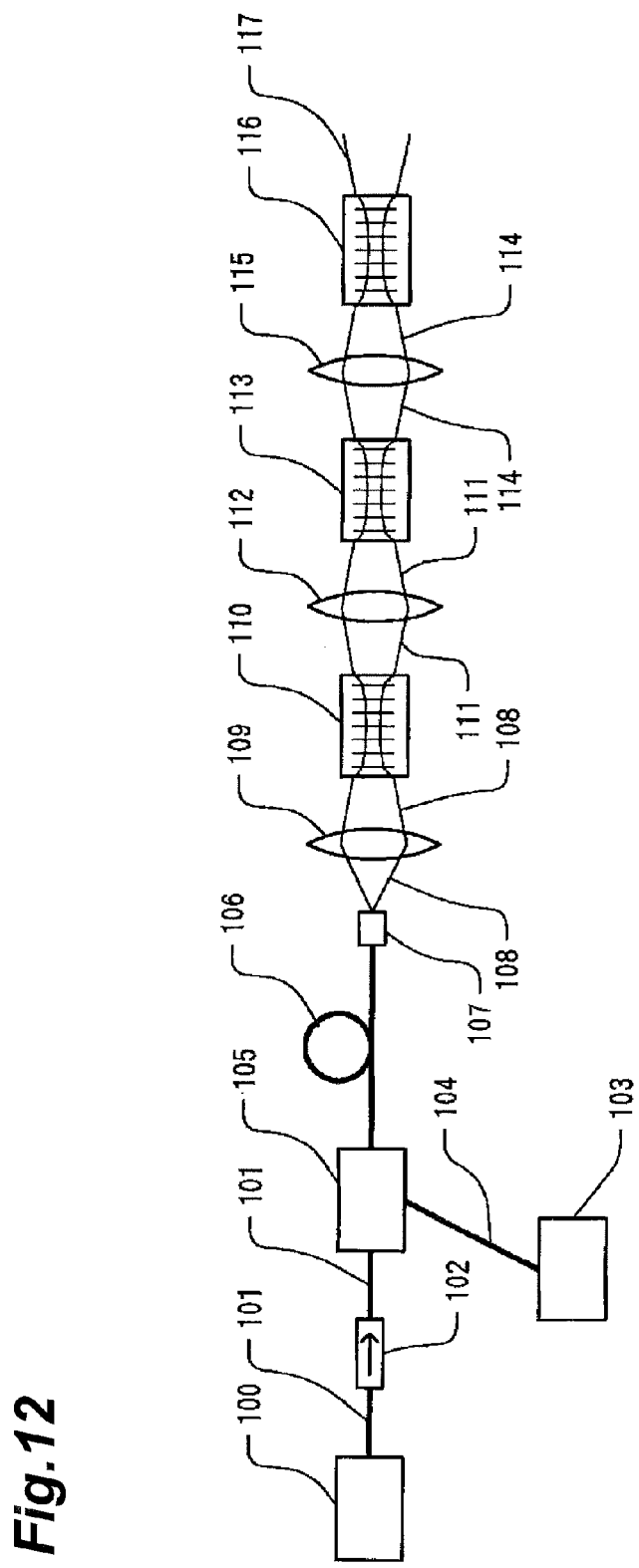
FIG. 12 is an exemplary configuration diagram of a light source device to generate an eighth harmonic with the wavelength of 193 nm from a solid-state laser source of the wavelength of 1544 nm.

Next, a light source device using the optical element of the first embodiment as wavelength conversion elements will be described as the third embodiment. FIG. 12 is an exemplary configuration diagram of the light source device to generate an eighth harmonic of the wavelength of 193 nm from a solid-state laser source of the wavelength of 1544 nm. In FIG. 12, an InGaAsP semiconductor laser 100 having the DFB structure is temperature-controlled by an unrepresented temperature control mechanism so as to lase at the wavelength of 1544 nm. Light of the wavelength of 1544 nm emitted from the semiconductor laser 100 propagates in a single-mode optical fiber 101, passes through an isolator 102, and again propagates in a single-mode optical fiber 101. A semiconductor laser 103 can lase at the wavelength of 980 nm or at the wavelength of 1480 nm. Light from the semiconductor laser 103 passes through a single-mode fiber 104 to merge with the light of the wavelength of 1544 nm in an optical multiplexer 105, and the multiplexed light is injected into an optical fiber 106 doped with a rare-earth element of erbium (Er). The erbium-doped optical fiber 106 herein is pumped by the light from the semiconductor laser 103 so as to function to amplify the light of the wavelength of 1544 nm.

The light amplified by the optical fiber 106 is emitted as outgoing light 108 from an optical fiber end face or a connector end face 107 into the space and is then injected through a lens 109 into a first wavelength conversion element 110 to generate a second harmonic 111 with the wavelength of 772 nm. The first wavelength conversion element 110 herein is a wavelength conversion element consisting of the aforementioned optical element of the first embodiment. In the paraelectric crystal included in the first wavelength conversion element 110, the periodic polarity inversion structure is formed so that the second harmonic satisfies the quasi-phase matching condition for the incoming light with the wavelength of 1544 nm, and the predetermined pressure is applied thereto through the pair of pressers.

The second harmonic 111 with the wavelength of 772 nm generated by the first wavelength conversion element 110 is guided through a lens 112 into a second wavelength conversion element 113 to generate a fourth harmonic 114 with the wavelength of 386 nm. The second wavelength conversion element 113 herein is a wavelength conversion element consisting of the aforementioned optical element of the first embodiment. In the paraelectric crystal included in the second wavelength conversion element 113, the periodic polarity inversion structure is formed so that the second harmonic satisfies the quasi-phase matching condition for the incoming light with the wavelength of 772 nm, and the predetermined pressure is applied thereto through the pair of pressers.

The fourth harmonic 114 with the wavelength of 386 nm generated in the second wavelength conversion element 113 is guided through a lens 115 into a third wavelength conversion element 116 to generate an eighth harmonic 117 with the wavelength of 193 nm. The third wavelength conversion element 116 herein is a wavelength conversion element consisting of the aforementioned optical element of the first embodiment. In the paraelectric crystal included in the third wavelength conversion element 116, the periodic polarity inversion structure is formed so that the second harmonic satisfies the quasi-phase matching condition for the incoming light with the wavelength of 386 nm, and the predetermined pressure is applied thereto through the pair of pressers. More specifically, when the paraelectric crystal in the third wavelength conversion element 116 is quartz crystal, the polarity inversion structure is formed in the period of about 9.6 μm in order to implement fifth-order quasi-phase matching.

Since the light source device having the above configuration uses the optical elements of the first embodiment as the wavelength conversion elements, the polarity inversion structures of the quasi-phase matching elements consisting of the paraelectric crystals can be maintained on a permanent basis and thus the short-wavelength laser light can be generated on a stable basis.

The preferred embodiments of the present embodiment were described above in detail, but it should be noted that the present embodiment is by no means limited to the above embodiments and modification example. For example, instead of the configuration wherein the projections and depressions are periodically formed in the surface of the paraelectric crystal S facing the main press member 11, 51 of the first presser 10, 50, the projections and depressions may be periodically formed in the surface facing the paraelectric crystal S, of the main press member 11, 51 of the first presser 10, 50. In another configuration, the projections and depressions do not have to be formed in either of the main press member 11, 51 and the paraelectric crystal S. In another configuration, the projections and depressions may be periodically formed in the surface of the paraelectric crystal S facing the main press member 21, 61 of the second presser, instead of the main press member 11, 51 of the first presser.

When the optical element is viewed in a direction perpendicular to the straight line direction (Z-direction) to connect the mutually facing surfaces of the first and second pressers 10, 50, 20, 60 by the shortest distance, any element other than the optical element may be located on a straight line along this direction. The optical element 1 does not always have to be provided with the position fixing devices 40A-40D. The paraelectric crystal S does not always have to be quartz crystal as long as it is a paraelectric material.

The first and second pressure heater blocks 2, 3 do not always have to include the heater function, and the optical element 1, 5 does not have to be heated in the press block.

The numbers of fasteners 30A-30D, 70A-70F do not always have to be the numbers described in the above embodiments and modification example, but they may be, for example, three or less, or seven or more. The fasteners 30A-30D, 70A-70F do not have to be the combination of bolts and female screws, but they may be any means that can fix the spacing between the first and second pressers 10, 50, 20, 60 and that can fasten the pressers to each other so as to apply the predetermined pressure between them.

The first and second pressers 10, 50, 20, 60 do not have to be limited to the configurations described in the above embodiments and modification example. Therefore, for example, the first and second main press members 13, 52, 23, 63 may be directly fixed, for example, to the plate-like members 11, 51, 21, 61, instead of the configuration wherein they are supported by the supports 12, 52, 22, 62. Without provision of the first and second plate-like members 11, 51, 21, 61, the fasteners 30A-30D, 70A-70F may directly fix the spacing between the first and second main press members 13, 52, 23, 63. In another configuration, without provision of the first and second main press members 13, 52, 23, 63, the first and second main press members 13, 52, 23, 63 may have portions (main press portions) in direct contact with the paraelectric crystal S.

Other embodiments can include exposure apparatus, inspection apparatus, and processing apparatus equipped with the light source device of the above embodiment. The configurations of parts except for the light source device in these apparatus may be, for example, those described in International Publication WO2008/010417. An exposure apparatus as one of the embodiments is an exposure apparatus used in a photolithography which is one of semiconductor or display device manufacture, and the exposure apparatus has the light source device, a pattern forming section to form a predetermined exposure pattern, a target holding section to hold an exposure target, an illumination optical system to illuminate the pattern forming section with the light emitted from the light source device, and a projection optical system to project the light from the pattern forming section to the exposure target held by the target holding section. The exposure pattern forming section herein may include a mask holding unit to hold a photomask, and may include a pattern forming means such as a micro mirror device to form a predetermined reflection pattern according to an input signal. In the foregoing exposure apparatus, the light output from the light source device is guided through the illumination optical system to the pattern forming section and the exposure pattern formed by the pattern forming section is projected through the projection optical system onto the exposure target such as a semiconductor wafer. The exposure apparatus as one of embodiments takes advantage of the characteristics of the light source device such as supply of stable output, compact and lightweight structure, and high freedom for arrangement, and thus has features of compact structure, good maintainability and operability, and stable operation over long periods. The exposure apparatus of the present embodiment takes advantage of the characteristics of the light source device such as supply of stable output, compact and lightweight structure, and high freedom for arrangement and thus has features of compact structure, good maintainability and operability, and stable operation over long periods. It has the feature of stable operation over long periods. An inspection apparatus as one of embodiments has the light source device, an illumination optical system to illuminate a specimen with the light emitted from the light source device, a projection optical system to project light from the specimen to a detector, and the detector to detect the light from the specimen. A specific mode of this inspection apparatus can be a mask defect inspection device. The mask defect inspection device optically projects a device pattern finely drawn on a photomask, onto a TDI sensor (Time Delay and Integration), compares a sensor image with a predetermined reference image, and extracts a defect of the pattern from a difference between them. The light from the light source device herein is guided through the illumination optical system consisting of a plurality of lenses to be applied to a predetermined region on the photomask supported on a mask support table. Light transmitted by the photomask travels through the projection optical system to be projected onto the TDI sensor as a detector, and an image of the mask pattern is focused on the sensor. The inspection apparatus of this mode does not have to be limited only to the inspection of photomask, but can also be used in inspection of semiconductor wafers, liquid crystal panels, and so on. The inspection apparatus of the present embodiment takes advantage of the characteristics of the light source device such as supply of stable output, compact and lightweight structure, and high freedom for arrangement and thus has features of compact structure, good maintainability and operability, and stable operation over long periods. It takes advantage of the characteristics of the light source device such as compact and lightweight structure and high freedom for arrangement and thus has features of compact structure, good maintainability and operability, and stable operation over long periods. A processing apparatus as one of embodiments has the light source device, an illumination optical system to illuminate a processing target position of a workpiece with the light emitted from the light source device, and a mechanism to vary relative positions of the illumination optical system and the workpiece. A specific mode of this processing apparatus is a macromolecular crystal processing device. The macromolecular crystal processing device is provided with an illumination optical system to focus and apply the light emitted from the light source device, onto a workpiece, an intensity adjustment element to adjust the intensity of the light to be applied, and an illumination position adjustment mechanism to adjust the position of illumination, and is configured to be able to apply the light of desired intensity to a desired position of a macromolecular crystal as the workpiece. The workpiece herein may be configured so as to be fixed on a three-dimensional stage and/or a rotational stage and so as to allow the workpiece to be moved according to the processing position. The processing device of the present embodiment may further have an optical microscope with a visible-light illumination device and a positioning reticle in order to check the processing position and may be configured to match a target position of the reticle (a center of a cross mark or the like) with the focus position of processing light in observation of the workpiece with the optical microscope. The processing device of the present embodiment takes advantage of the characteristics of the light source device such as supply of stable output, compact and lightweight structure, and high freedom for arrangement and thus has features of compact structure, good maintainability and operability, and stable operation over long periods.

An example of the optical element according to the first embodiment will be specifically described below.

A quartz crystal plate (5° Y-cut plate) in which projections and depressions were formed in the period of 41.7 μm in its surface by etching was prepared as the paraelectric crystal S. Quartz crystal is expected to be used as an element for achieving second harmonic generation of 532 nm from incoming light of the wavelength of 1064 nm.

Quartz crystal was located between the first and second pressure heater blocks 2, 3 in a state in which it was sandwiched in between the first and second pressers 10, 20. A heat-resistant lubricant consisting primarily of molybdenum disulfide was applied to between each pair of the pressers and the heater blocks. Under weak pressure applied through the first and second pressure heater blocks, the temperature of these heaters was adjusted to about 200° C. to 300° C. In that state the pressure of not less than 400 MPa was applied to the first and second pressers 10, 20 to form the polarity inversion structure in the period of 41.7 μm along the polarity period direction K in the quartz crystal. The formation of the polarity inversion structure was confirmed by optical "in-situ observation" of the quartz crystal from its side face. The observation was conducted by the cross-Nicol method to observe a difference of strain-induced birefringent amounts due to application of external force, by making use of a difference between photoelastic constants of polarity inverted portions and polarity non-inverted portions. After it was confirmed by the result of this observation that the periodic polarity inversion structure was formed in the entire region of the quartz crystal side face, the system was cooled to room temperature while keeping constant pressure of the pressure heater blocks 2, 3, and the bolts 31A-31D of the fasteners 30A-30D were fastened. On this occasion, uniform tightening torque was exerted on each bolt and at every increase of about 0.1 N·m (corresponding to about 0.14 kN in terms of overall axial force) of tightening torque, the load applied through the pressure heater blocks was reduced by the same degree. In a final state in which the bolts 31A-31D applied the total load of about 1 kN capable of maintaining the polarity inversion structure, the optical element 1 was taken out.

An experiment below was conducted using the optical element 1 obtained as described above, as a wavelength conversion element. Namely, the wavelength conversion experiment was conducted in order to confirm that when a fundamental wave with the wavelength of 1064 nm was injected as ordinary light parallel to the polarity period direction K of quartz crystal as the paraelectric crystal of the optical element 1, a second harmonic with the wavelength of 532 nm was generated as ordinary light parallel to the polarity period direction K. The quartz crystal S used was plate-like one having the dimensions of 8 mm in the length direction in which rays travel, 1 mm in the polarity period direction K being the width direction, and 1 mm in the thickness direction. The end faces for entrance of the fundamental wave and exit of the second harmonic were optically polished. The coherence length (Lc), which is the distance where the phase difference between second harmonics continually generated in the optical path of the fundamental wave becomes π, i.e., where cancellation of second harmonics starts, is represented by formula (12) below, wherein under the present experiment condition, λ is the wavelength of the fundamental wave, $n_o(\omega)$ the refractive index for ordinary light of the fundamental wave, and $n_o(2\omega)$ the refractive index for second harmonic.

$$Lc = \frac{\lambda}{4(n_o(2\omega) - n_o(\omega))} \quad (12)$$

The period d of the periodic structure is expressed by formula (13) below.

$$d = \frac{m\lambda}{2(n_o(2\omega) - n_o(\omega))} \quad (13)$$

In this formula m is a number indicative of the order of QPM which is a natural number. In the present experiment first-order quasi-phase matching was implemented and the periodic structure was prepared in the period d of 41.7 μm. However, precise phase matching was adjusted by slightly inclining the direction of incidence of the fundamental wave.

According to the result of the experiment, the signal of second harmonic of 120 mW was confirmed by the detector, for the incident fundamental wave with the pulsed laser average output of 3.1 W, repetition frequency of 30 kHz, pulse duration of 8.8 nsec, and beam diameter of 200 μm, and it was thus confirmed that wavelength conversion from 1064 nm to 532 nm was realized.

It was confirmed by the result of the wavelength conversion experiment that the polarity inversion structure could be readily maintained, without execution of precise temperature and pressure control for preservation of inverted domains in the quartz crystal S of the optical element 1 according to the first embodiment.

It will be understood by those skilled in the art that aspects of embodiments of the subject matter disclosed above are intended to satisfy the requirement of disclosing at least one enabling embodiment of the subject matter of each claim and to be one or more such exemplary embodiments only and to not to limit the scope of any of the claims in any way and particularly not to a specific disclosed embodiment alone. Many changes and modification can be made to the disclosed aspects of embodiments of the disclosed subject matter of the claims that will be understood and appreciated by those skilled in the art, particularly in regard to interpretation of the claims for purposes of the doctrine of equivalents. The appended claims are intended in scope and meaning to cover not only the disclosed aspects of embodiments of the claimed subject matter but also such equivalents and other modifications and changes that would be apparent to those skilled in the art. In additions to changes and modifications to the disclosed and claimed aspects of the subject matter disclosed of the disclosed subject matter(s) noted above, others could be implemented.

While the particular aspects of embodiment(s) of the {TITLE} described and illustrated in this patent application in the detail required to satisfy 35 U.S.C. §112 is fully capable of attaining any above-described purposes for, problems to be solved by or any other reasons for or objects of the aspects of an embodiment(s) above described, it is to be understood by those skilled in the art that it is the presently described aspects of the described embodiment(s) of the subject matter claimed are merely exemplary, illustrative and representative of the subject matter which is broadly contemplated by the claimed subject matter. The scope of the presently described and claimed aspects of embodiments fully encompasses other embodiments which may now be or may become obvious to those skilled in the art based on the teachings of the Specification. The scope of the present {TITLE} is solely and completely limited by only the appended claims and nothing beyond the recitations of the appended claims. Reference to an element in such claims in the singular is not intended to mean nor shall it mean in interpreting such claim element "one and only one" unless explicitly so stated, but rather "one or more". All structural and functional equivalents to any of the elements of the above-described aspects of an embodiment(s) that are known or later come to be known to those of ordinary skill in the art are expressly incorporated herein by reference and are intended to be encompassed by the present claims. Any term used in the Specification and/or in the claims and expressly given a meaning in the Specification and/or claims in the present application shall have that meaning, regardless of any dictionary or other commonly used meaning for such a term. It is not intended or necessary for a device or method discussed in the Specification as any aspect of an embodiment to address each and every problem sought to be solved by the aspects of embodiments disclosed in this application, for it to be encompassed by the present claims. No element, component, or method step in the present disclosure is intended to be dedicated to the public regardless of whether the element, component, or method step is explicitly recited in the claims. No claim element in the appended claims is to be construed under the provisions of 35 U.S.C. §112, sixth paragraph, unless the element is expressly recited using the phrase "means for" or, in the case of a method claim, the element is recited as a "step" instead of an "act."

It will be understood also be those skilled in the art that, in fulfillment of the patent statutes of the United States, Applicant(s) has disclosed at least one enabling and working embodiment of each invention recited in any respective claim appended to the Specification in the present application and perhaps in some cases only one. For purposes of cutting down on patent application length and drafting time and making the present patent application more readable to the inventor(s) and others, Applicant(s) has used from time to time or throughout the present application definitive verbs (e.g., "is", "are", "does", "has", "includes" or the like) and/or other definitive verbs (e.g., "produces," "causes" "samples," "reads," "signals" or the like) and/or gerunds (e.g., "producing," "using," "taking," "keeping," "making," "determining," "measuring," "calculating" or the like), in defining an aspect/feature/element of, an action of or functionality of, and/or describing any other definition of an aspect/feature/element of an embodiment of the subject matter being disclosed. Wherever any such definitive word or phrase or the like is used to describe an aspect/feature/element of any of the one or more embodiments disclosed herein, i.e., any feature, element, system, sub-system, component, sub-component, process or algorithm step, particular material, or the like, it should be read, for purposes of interpreting the scope of the subject matter of what applicant(s) has invented, and claimed, to be preceded by one or more, or all, of the following limiting phrases, "by way of example," "for example," "as an example," "illustratively only," "by way of illustration only," etc., and/or to include any one or more, or all, of the phrases "may be," "can be", "might be," "could be" and the like. All such features, elements, steps, materials and the like should be considered to be described only as a possible aspect of the one or more disclosed embodiments and not as the sole possible implementation of any one or more aspects/features/elements of any embodiments and/or the sole possible embodiment of the subject matter of what is claimed, even if, in fulfillment of the requirements of the patent statutes, Applicant(s) has disclosed only a single enabling example of any such aspect/feature/element of an embodiment or of any embodiment of the subject matter of what is claimed. Unless expressly and specifically so stated in the present application or the prosecution of this application, that Applicant(s) believes that a particular aspect/feature/element of any disclosed embodiment or any particular disclosed embodiment of the subject matter of what is claimed, amounts to the one an only way to implement the subject matter of what is claimed or any aspect/feature/element recited in any such claim, Applicant(s) does not intend that any description of any disclosed aspect/feature/element of any disclosed embodiment of the subject matter of what is claimed in the present patent application or the entire embodiment shall be interpreted to be such one and only way to implement the subject matter of what is claimed or any aspect/feature/element thereof, and to thus limit any claim which is broad enough to cover any such disclosed implementation along with other possible implementations of the subject matter of what is claimed, to such disclosed aspect/feature/element of such disclosed embodiment or such disclosed embodiment. Applicant(s) specifically, expressly and unequivocally intends that any claim that has depending from it a dependent claim with any further detail of any aspect/feature/element, step, or the like of the subject matter of what is claimed recited in the parent claim or claims from which it directly or indirectly depends, shall be interpreted to mean that the recitation in the parent claim(s) was broad enough to cover the further detail in the dependent claim along with other implementations and that the further detail was not the only way to implement the aspect/feature/element claimed in any such parent claim(s), and thus be limited to the further detail of any such aspect/feature/element recited in any such dependent claim to in any way limit the scope of the broader aspect/feature/element of any such parent claim, including by incorporating the further detail of the dependent claim into the parent claim.

What is claimed is:

1. An optical element comprising:
   a paraelectric crystal with a periodic structure in which polarities are periodically inverted along a polarity period direction;
   a pair of pressers between which the paraelectric crystal is sandwiched; and
   a fastener which fixes the pair of pressers to each other so as to apply a predetermined pressure to the paraelectric crystal through the pair of pressers in a direction intersecting with the polarity period direction so that the optical element can maintain the polarity-periodic-inversion structure of the paraelectric crystal.

2. The optical element according to claim 1, wherein the fastener fixes the pair of pressers to each other so as to apply the predetermined pressure in a direction substantially perpendicular to the polarity period direction, to the paraelectric crystal through the pair of pressers.

3. The optical element according to claim 1, wherein projections and depressions are periodically formed in a surface of the paraelectric crystal facing at least one of the pair of pressers.

4. The optical element according to claim 1, wherein at least one of the pair of pressers has a surface facing the paraelectric crystal and wherein projections and depressions are periodically formed in the surface.

5. The optical element according to claim 1, wherein the pair of pressers have respective surfaces facing each other, and wherein when the paraelectric crystal is viewed along a predetermined direction perpendicular to a straight line direction to connect the surfaces facing each other, by the shortest distance, there is nothing located except for the paraelectric crystal on a straight line along the predetermined direction.

6. The optical element according to claim 1, further comprising:
a position fixing device which fixes relative positions between the pair of pressers.

7. The optical element according to claim 1, wherein the paraelectric crystal includes quartz crystal.

8. The optical element according to claim 1, wherein the paraelectric crystal includes a periodic twin corresponding to the periodic structure.

9. The optical element according to claim 8, wherein the twin includes a Dauphine twin.

10. The optical element according to claim 1, wherein the fastener fixes the pair of pressers to each other by fixing a spacing between the pair of pressers.

11. The optical element according to claim 1, wherein the predetermined pressure is a pressure enough to maintain the periodic structure of the crystal.

12. The optical element according to claim 1, wherein a period of the periodic structure is not more than 10 μm.

13. The optical element according to claim 3, wherein a period of the projections and depressions is not more than 10 μm.

14. The optical element according to claim 4, wherein a period of the projections and depressions is not more than 10 μm.

15. The optical element according to claim 1, wherein the optical element includes a wavelength conversion element to generate light with a wavelength of not more than 200 nm.

16. A light source device comprising a wavelength conversion section to convert light of a first wavelength to light of a second wavelength, wherein the wavelength conversion section includes the optical element as defined in claim 1.

17. A method for producing an optical element comprising a paraelectric crystal consisting of a paraelectric material, a pair of pressers, and a fastener to fix the pair of pressers to each other, the paraelectric crystal having a periodic structure in which polarities are periodically inverted along the polarity period direction, the method comprising:
pressing the paraelectric crystal through the pair of pressers with the paraelectric crystal being arranged between the pair of pressers, under a predetermined pressure along a straight line direction to connect mutually facing surfaces of the pair of pressers by the shortest distance;
fixing the pair of pressers to each so as to apply the predetermined pressure to the paraelectric crystal through the pair of pressers in a direction intersecting with a polarity period direction, so that the optical element can maintain the polarity-periodic inversion structure of the paraelectric crystal.

18. The method according to claim 17,
wherein the pressing comprises pressurizing the pair of pressers by a pair of pressure blocks in a state in which the pair of pressers with the paraelectric crystal in between are sandwiched between the pair of pressure blocks, thereby to press the paraelectric crystal under the predetermined pressure,
the method further comprising: taking out the paraelectric crystal held by the pair of pressers, together with the pair of pressers, from between the pair of pressure blocks, after the fixing.

19. The method according to claim 17,
wherein in the pressing, the pair of pressers are heated so that one presser becomes hotter than the other presser, and wherein the pair of pressers with a temperature difference press the paraelectric crystal.

20. The method according to claim 17,
wherein projections and depressions are periodically formed in a surface of the paraelectric crystal facing the hotter presser out of the pair of pressers.

21. The method according to claim 17,
wherein the hotter presser out of the pair of pressers has a surface facing the paraelectric crystal and wherein projections and depressions are periodically formed in the surface.

22. The method according to claim 17, wherein projections and depressions are periodically formed in a surface of the paraelectric crystal facing at least one of the pair of pressers.

23. The method according to claim 17, wherein at least one of the pair of pressers has a surface facing the paraelectric crystal and wherein projections and depressions are periodically formed in the surface.

24. The method according to claim 17, wherein the pair of pressers have respective surfaces facing each other, and
wherein when the paraelectric crystal is viewed along a predetermined direction perpendicular to a straight line direction to connect the mutually facing surfaces by the shortest distance, there is nothing located except for the paraelectric crystal on a straight line along the predetermined direction.

25. The method according to claim 17, wherein relative positions between the pair of pressers are fixed by a position fixing device.

26. The method according to claim 17, wherein the paraelectric crystal includes quartz crystal.

27. The method according to claim 17, wherein in the fixing, the pair of pressers are fixed to each other by the fastener fixing a spacing between the pair of pressers corresponding to the predetermined pressure.

28. The method according to claim 17, wherein by fixing the pair of pressers to each other while pressing the paraelectric crystal under the predetermined pressure, the paraelectric crystal pressed under the predetermined pressure is taken out, together with the pair of pressers, from between the pair of pressure blocks.

* * * * *

UNITED STATES PATENT AND TRADEMARK OFFICE
CERTIFICATE OF CORRECTION

PATENT NO. : 9,140,958 B2
APPLICATION NO. : 13/627308
DATED : September 22, 2015
INVENTOR(S) : Harada et al.

Page 1 of 1

It is certified that error appears in the above-identified patent and that said Letters Patent is hereby corrected as shown below:

In the claims

Claim 17, Column 27, Line 44

After "each" insert --other--.

Signed and Sealed this
Fifteenth Day of December, 2015

Michelle K. Lee
*Director of the United States Patent and Trademark Office*